United States Patent
Murata

(10) Patent No.: US 11,804,055 B2
(45) Date of Patent: Oct. 31, 2023

(54) INFORMATION PROCESSING APPARATUS, INFORMATION PROCESSING METHOD, AND INFORMATION PROCESSING SYSTEM

(71) Applicant: Jun Murata, Tokyo (JP)

(72) Inventor: Jun Murata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 261 days.

(21) Appl. No.: 17/335,352

(22) Filed: Jun. 1, 2021

(65) Prior Publication Data
US 2021/0390295 A1    Dec. 16, 2021

(30) Foreign Application Priority Data

Jun. 12, 2020  (JP) .................. 2020-102623

(51) Int. Cl.
*G06V 30/412*  (2022.01)
*G06V 30/10*   (2022.01)

(52) U.S. Cl.
CPC ............ *G06V 30/412* (2022.01); *G06V 30/10* (2022.01)

(58) Field of Classification Search
CPC .............................. G06V 30/412; G06V 30/10
See application file for complete search history.

(56) References Cited

U.S. PATENT DOCUMENTS

| 2011/0026064 | A1  | 2/2011 | Kato et al. |
| 2021/0279460 | A1* | 9/2021 | Kobayashi .......... G06V 30/416 |
| 2022/0101643 | A1* | 3/2022 | Takagi ................. G06F 40/186 |

FOREIGN PATENT DOCUMENTS

| JP | 2001-195288 | 7/2001 |
| JP | 2002-163106 | 6/2002 |
| JP | 2005-310175 | 11/2005 |
| JP | 2011-048812 | 3/2011 |
| JP | 2011-192317 | 9/2011 |
| JP | 2016-051339 | 4/2016 |

* cited by examiner

*Primary Examiner* — Helen Zong
(74) *Attorney, Agent, or Firm* — IPUSA, PLLC

(57) ABSTRACT

An information processing apparatus includes circuitry. The circuitry performs ledger sheet recognition on ledger sheet image data, and refers to an association information storage area storing association information representing an output order of a plurality of item values of each of a plurality of item names. The plurality of item values are acquired based on the ledger sheet recognition. The circuitry further generates output data in which the plurality of item values of the each of the plurality of item names are arranged in the output order represented by the association information. The circuitry further outputs the generated output data.

6 Claims, 21 Drawing Sheets

| ITEM NAME | ITEM VALUE | TYPE |
|---|---|---|
| BILLER | XXYY CENTER | CHARACTER STRING |
| DATE OF INVOICE | 2018/07/2 | DATE |
| TAX-EXCLUDED BILLING AMOUNT | 1,657,600 | NUMBER |
| TAX-INCLUDED BILLING AMOUNT | — | — |
| ITEMIZED ARTICLE NAME 1 | RECEPTION TABLE | CHARACTER STRING |
| ITEMIZED PRICE 1 | 119,600 | NUMBER |
| ... | ... | |

260-2

JOURNAL INFORMATION

| ID | PRICE | ITEM CODE | COMPONENT CODE | SUBSIDIARY CODE | TAX INCLUDED/EXCLUDED | NOTES |
|---|---|---|---|---|---|---|
| I1 | 119,600 | 0001 | 12345678 | 123 | TAX INCLUDED | RECEPTION TABLE |
| I2 | 722,400 | 0003 | 11111111 | 222 | TAX INCLUDED | OFFICE DESK, CHAIR |
| ... | ... | ... | ... | ... | ... | ... |

| XXYY CENTER | 2018/7/20 | 119,600 | RECEPTION TABLE | ... |
|---|---|---|---|---|

| ACCOUNT ITEM CODE | ACCOUNT ITEM NAME | INDEX | CREDIT/DEBIT | ITEM CATEGORY CODE | USE/NON-USE | DEBIT TAX CATEGORY CODE | CREDIT TAX CATEGORY CODE | AUTOMATIC CALCULATION OF CONSUMPTION TAX |
|---|---|---|---|---|---|---|---|---|
| 2160 | ACCOUNT PAYABLE-TRADE | 1 | 0 | | | | | |
| 2170 | ACCOUNT PAYABLE-OTHER | 2 | 0 | | | | | |

280-2

| ACCOUNT ITEM CODE | SUBSIDIARY ITEM CODE | SUBSIDIARY ITEM NAME | INDEX | SAME SETTINGS AS ACCOUNT ITEM | DEBIT TAX CATEGORY CODE | CREDIT TAX CATEGORY CODE | AUTOMATIC CALCULATION OF CONSUMPTION TAX | ROUNDING |
|---|---|---|---|---|---|---|---|---|
| 2160 | 1110 | HEAD OFFICE | 0 | | 1 | 1 | 0 | |
| 2160 | 1111 | BRANCH OFFICE | 1 | | 1 | 1 | 0 | |
| 2200 | 2110 | KANAGAWA | 2 | | 1 | 1 | 0 | |

Cell1=[{yyyy/mm/dd},{Doc$InvoiceDate}:0.9,{Date}:0.1]]
Cell2=[[ACCOUNT ITEM MASTER$Cell1]]
Cell3=[[ACCOUNT ITEM MASTER$Cell2]]
...

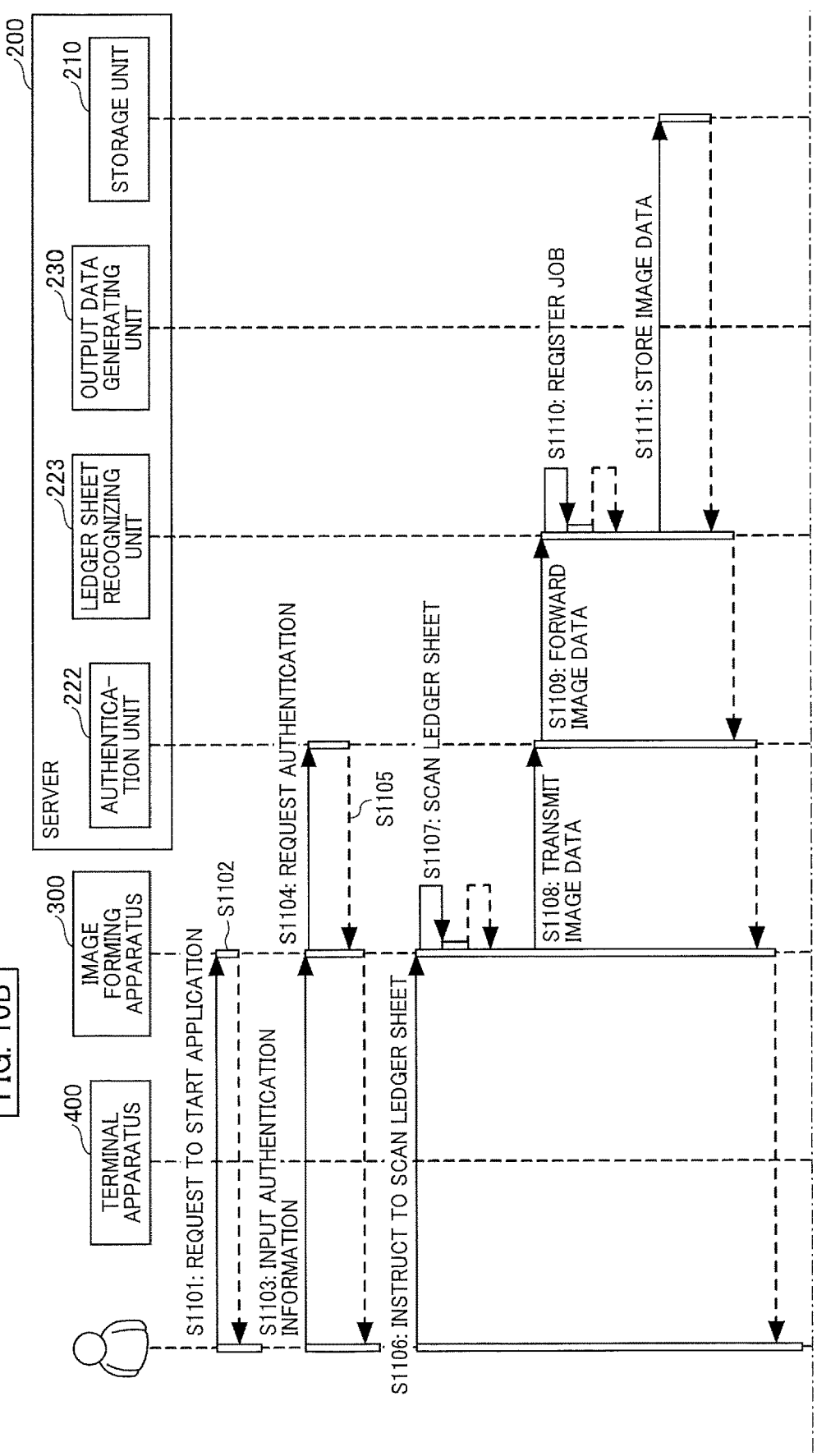

FIG. 11

| JOB ID | ISSUER | LEDGER SHEET IMAGE FILE PATH | RECOGNITION RESULT FILE PATH | STATUS |
|--------|--------|------------------------------|------------------------------|--------|
| J1 | COMPANY A | XXX | YYYY | UNPROCESSED |
| J2 | COMPANY B | XXY | ... | ... |
| ⋮ | ⋮ | ⋮ | ⋮ | ⋮ |

| ID | X COOR-DINATE | Y COOR-DINATE | WIDTH OF CHARACTER | HEIGHT OF CHARACTER | DEGREE OF CERTAINTY | CHAR-ACTER |
|---|---|---|---|---|---|---|
| 73 | 385 | 552 | 77 | 45 | 99 | 商 |
| 74 | 363 | 552 | 76 | 42 | 99 | 品 |
|  |  |  | ...... |  |  | コ |
| 76 | 958 | 553 | 19 | 32 | 98 | ー |
| 77 | 990 | 552 | 32 | 28 | 99 | ド |
| 78 | 1018 | 549 | 28 | 27 | 99 |  |
| 79 | 1040 | 551 | 22 | 28 | 99 |  |
|  |  |  | ...... |  |  |  |
| 98 | 385 | 606 | 77 | 37 | 98 | A |
|  |  |  | ...... |  |  |  |
| 99 | 958 | 606 | 14 | 37 | 98 | 3 |
| 100 | 972 | 613 | 15 | 23 | 99 | 0 |
| 101 | 987 | 614 | 15 | 20 | 99 | 0 |
| 102 | 1002 | 613 | 11 | 26 | 99 | , |
| 103 | 1013 | 615 | 15 | 27 | 99 | 0 |
| 104 | 1028 | 607 | 13 | 35 | 99 | 0 |
| 105 | 1042 | 609 | 14 | 32 | 99 | 0 |
|  |  |  | ...... |  |  |  |

~141

| ID | X COOR-DINATE | Y COOR-DINATE | WIDTH OF KEYWORD | HEIGHT OF KEYWORD | KEYWORD |
|---|---|---|---|---|---|
| 17 | 385 | 552 | 153 | 45 | ARTICLE CODE |
|  |  |  | ...... |  |  |
| 22 | 985 | 553 | 310 | 32 | ARTICLE NAME |
|  |  |  | ...... |  |  |
| 36 | 358 | 606 | 77 | 37 | ... |
|  |  |  | ...... |  |  |
| 41 | 958 | 606 | 84 | 15 | ... |
|  |  |  | ...... |  |  |

~142

| CELL ID | X COOR-DINATE | Y COOR-DINATE | WIDTH OF CELL | HEIGHT OF CELL |
|---|---|---|---|---|
| 2 | 355 | 532 | 221 | 82 |
|  |  |  | ...... |  |
| 7 | 955 | 532 | 380 | 82 |
|  |  |  | ...... |  |
| 9 | 355 | 619 | 221 | 80 |
|  |  |  | ...... |  |

| COLUMN ID | ITEM NAME | COLUMN COORDINATES | ROW ID | ITEM VALUE |
|---|---|---|---|---|
| 1 | ARTICLE CODE | (200,532)-(355,955) | 1 | 10845 |
| | | | 2 | 22563 |
| 2 | ARTICLE NAME | (355,532)-(576,955) | 1 | RECEPTION TABLE |
| | | | 2 | OFFICE DESK |
| | ... | ... | ... | ... |

INFORMATION PROCESSING APPARATUS, INFORMATION PROCESSING METHOD, AND INFORMATION PROCESSING SYSTEM

CROSS-REFERENCE TO RELATED APPLICATION

This patent application is based on and claims priority pursuant to 35 U.S.C. § 119(a) to Japanese Patent Application No. 2020-102623 filed on Jun. 12, 2020 in the Japan Patent Office, the entire disclosure of which is hereby incorporated by reference herein.

BACKGROUND

Technical Field

The present invention relates to an information processing apparatus, an information processing method, and an information processing system.

Description of the Related Art

There is a ledger sheet recognition system that extracts, from image data of a ledger sheet itemizing combinations of a plurality of item names and a plurality of item values, data associating the item names with the item values. There is also an application program for executing a process of adding, to a core system that performs core business operations, for example, item values of items managed in the core system.

For example, when adding the data extracted by the ledger sheet recognition system to the core system, the data output to the core system from the ledger sheet recognition system should be compatible with the format of the core system.

In this case, the addition of the item values to the core system is typically executed by a user manually inputting the item values thereto in accordance with the format of the core system with reference to the data extracted by the ledger sheet recognition system, which causes inconvenience to the user.

SUMMARY

In one embodiment of this invention, there is provided an improved information processing apparatus that includes, for example, circuitry that performs ledger sheet recognition on ledger sheet image data, and refers to an association information storage area storing association information representing an output order of a plurality of item values of each of a plurality of item names. The plurality of item values are acquired based on the ledger sheet recognition. The circuitry further generates output data in which the plurality of item values of the each of the plurality of item names are arranged in the output order represented by the association information. The circuitry further outputs the generated output data.

In one embodiment of this invention, there is provided an improved information processing method that includes, for example, performing ledger sheet recognition on ledger sheet image data, referring to an association information storage area storing association information representing an output order of a plurality of item values of each of a plurality of item names. The plurality of item values are acquired based on the ledger sheet recognition. The information processing method further includes generating output data in which the plurality of item values of the each of the plurality of item names are arranged in the output order represented by the association information, and outputting the generated output data.

In one embodiment of this invention, there is provided an improved information processing system that includes, for example, a memory and one or more processors. The memory stores association information representing an output order of a plurality of item values of each of a plurality of item names. The plurality of item values are acquired based on ledger sheet recognition. The processors perform the ledger sheet recognition on ledger sheet image data. In response to receipt of an instruction from a terminal apparatus, the processors generate output data in which the plurality of item values of the each of the plurality of item names are arranged in the output order represented by the association information stored in the memory. The processors further output the generated output data.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is a diagram illustrating an example of a recognition result database in the server of the embodiment;

FIG. 5 is a diagram illustrating an example of an output database in the server of the embodiment;

FIG. 6 is a diagram illustrating an example of a master database in the server of the embodiment;

FIG. 7 is a diagram illustrating an example of an association database in the server of the embodiment;

FIGS. 10A and 10B are a sequence diagram illustrating an operation of the ledger sheet recognition system of the embodiment;

FIG. 11 is a diagram illustrating an example of a job list of the embodiment;

FIG. 13 is a diagram illustrating an example of a recognition result check screen of the embodiment;

FIGS. 14A and 14B are diagrams illustrating extraction of description information of the embodiment;

DETAILED DESCRIPTION

Figure 1:
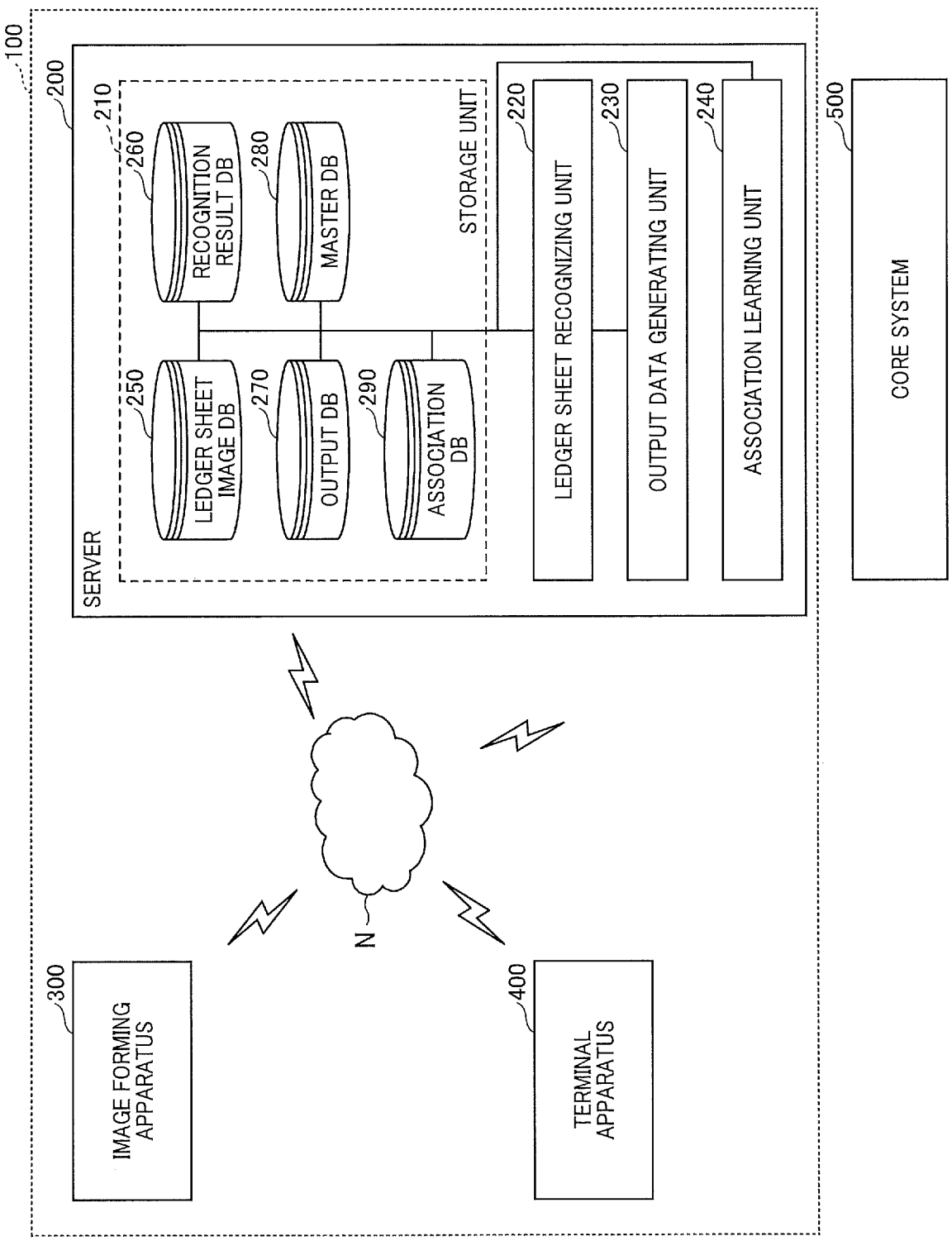
FIG. 1 is a diagram illustrating an example of the system configuration of a ledger sheet recognition system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment of the present invention will be described below with reference to the drawings.

FIG. 1 is a diagram illustrating an example of the system configuration of a ledger sheet recognition system of the embodiment.

A ledger sheet recognition system 100 of the embodiment includes a server 200, an image forming apparatus 300, and a terminal apparatus 400, which are connected to each other via a network N. The ledger sheet recognition system 100 of the embodiment is an example of an information processing system.

The terminal apparatus 400 of the embodiment is connected to a core system 500 via the network N, for example. The core system 500 is a system that performs a particular process with a result of recognizing a ledger sheet in the ledger sheet recognition system 100 of the embodiment, for example. Specifically, the core system 500 may be an accounting system or a quotation preparation system, for example.

In the ledger sheet recognition system 100 of the embodiment, the server 200 extracts, from image data representing the image of a ledger sheet read by a scanner function of the image forming apparatus 300, item names and item values included in the ledger sheet, and generates text data associating the item names with the item values.

In the following description, the image of the ledger sheet read by the scanner function of the image forming apparatus 300 will be described as the ledger sheet image, and the image data representing the ledger sheet image will be described as the ledger sheet image data.

Further, in the following description, extracting the item names and the corresponding item values from the ledger sheet image and converting the item names and the item values into text data associating the item names with the item values will be described as the ledger sheet recognition.

The ledger sheet recognition system 100 of the embodiment generates output data in which the item values acquired as a result of the ledger sheet recognition are arranged in the order according to a format compatible with the core system 500. The ledger sheet recognition system 100 then outputs the generated output data to the core system 500.

Further, in the embodiment, based on the output data output to the core system 500 and the result of the ledger sheet recognition, the correspondence relationship between the item values acquired as the result of the ledger sheet recognition and the respective positions of the item values in the format compatible with the core system 500 is learned to generate association information representing the correspondence relationship. That is, the association information of the embodiment is information representing the output order of the item values of each of the item names obtained through the ledger sheet recognition.

The server 200 of the embodiment includes a storage unit 210, a ledger sheet recognizing unit 220, an output data generating unit 230, and an association learning unit 240.

The storage unit 210 includes a ledger sheet image database (DB) 250, a recognition result DB 260, an output DB 270, a master DB 280, and an association DB 290.

The ledger sheet image DB 250 stores the ledger sheet image data. The recognition result DB 260 stores recognition result data, which is information representing the result of the ledger sheet recognition performed by the ledger sheet recognizing unit 220.

The output DB 270 stores the output data generated by the output data generating unit 230 based on the recognition result data and output to the core system 500. That is, the output data stored in the output DB 270 is already output data that has been output to the core system 500. The output data of the embodiment is data including the item values of each of the item names stored in the recognition result DB 260, specifically comma separated value (CSV)-formatted data, for example.

The master DB 280 stores data compatible with the core system 500 and referred to to display a recognition result check screen for checking the recognition result data.

The association DB 290 stores the association information. Based on the information stored in the recognition result DB 260 and the output data stored in the output DB 270, the association information represents the respective positions, in the output data, of the item values extracted through the ledger sheet recognition.

The ledger sheet recognizing unit 220 of the embodiment acquires the ledger sheet image data stored in the ledger sheet image DB 250, extracts from the ledger sheet image data the item names and the item values included in the ledger sheet, and generates text data associating the item names with the item values. The ledger sheet recognizing unit 220 further receives a variety of inputs to the result of the ledger sheet recognition.

Specifically, the ledger sheet recognizing unit 220 displays the recognition result check screen for checking the result of the ledger sheet recognition. The recognition result check screen includes an input field based on the ledger sheet image data, the text data acquired as the result of the ledger sheet recognition, and master data stored in the master DB 280. The ledger sheet recognizing unit 220 further receives a variety of inputs to the recognition result check screen.

The following description will be given of an invoice as an example of the ledger sheet. The recognition result check screen of the embodiment includes, for example, a display field that displays the ledger sheet image, a display field that displays the text data associating the item names with the item values, and an input field to which the item values corresponding to the item names included in master data are input.

In the present example, the ledger sheet image is the image of the invoice. The text data includes information related to the invoice (hereinafter referred to as the invoice information) and information related to descriptions in a description section of the invoice (hereinafter referred to as the description information).

The invoice information represents the issuer of the invoice, the date of invoice, and the billing address, for example. That is, the invoice information is an example of information related to the issuer of the ledger sheet (the invoice in the present example) from which the ledger sheet image is generated. The description information is information in which description item names and description item values described in the description section of the ledger sheet are associated with each other.

The input field is a field for inputting journal information. The journal information is input to the input field by a user selecting the values to be input thereto from the master data, while checking the contents of the descriptions, for example, with reference to the ledger sheet image (the image of the invoice in the present example).

The recognition result data of the embodiment includes the invoice information and the description information extracted from the ledger sheet image data and the journal information input through the user operation. Details of the recognition result check screen will be described later.

The ledger sheet is not limited to the invoice, and may be a statement of delivery, a quotation, or a purchase slip, for example.

With reference to the association DB 290, the output data generating unit 230 generates the output data in which the item values acquired as the result of the ledger sheet recognition are arranged in the order according to the format compatible with the core system 500. The output data generating unit 230 then outputs the generated output data to the core system 500.

Based on the output data output to the core system 500 and the result of the ledger sheet recognition, the association learning unit 240 associates the item values acquired as the result of the ledger sheet recognition with the core system 500.

In the ledger sheet recognition system 100 of the embodiment, the image forming apparatus 300 is a multifunction peripheral (MFP) with a scanner function. The image forming apparatus 300 is installed with applications (i.e., application programs) for implementing functions such as the scanner function, a copier function, and a facsimile (FAX) function. When the application corresponding to a desired one of the functions is selected, the desired function is implemented.

The terminal apparatus 400 of the embodiment is used by the user of the ledger sheet recognition system 100. The terminal apparatus 400 may display the result of the ledger sheet recognition performed by the server 200.

In the embodiment, the user is a business establishment, company, firm, or organization, for example, which has a contract to use a service provided by the ledger sheet recognition system 100.

In the configuration example of FIG. 1, the server 200 includes five databases in the storage unit 210. The databases, however, are not limited to this example. The databases may be partially disposed outside the server 200, or all of the databases may be included in an external apparatus.

Further, in the example of FIG. 1, the ledger sheet recognizing unit 220, the output data generating unit 230, and the association learning unit 240 are implemented by the server 200. However, the ledger sheet recognizing unit 220, the output data generating unit 230, and the association learning unit 240 are not necessarily implemented by the server 200, and may be implemented by a plurality of information processing apparatuses.

Further, in the example of FIG. 1, the ledger sheet recognition system 100 includes one image forming apparatus 300 and one terminal apparatus 400. The ledger sheet recognition system 100, however, may include a desired number of image forming apparatuses 300 and a desired number of terminal apparatuses 400.

Further, in the example of FIG. 1, the output destination of the output data from the ledger sheet recognition system 100 is the single core system 500. However, there may be a plurality of core systems 500 as the output destinations of the output data from the ledger sheet recognition system 100.

Further, in the example of FIG. 1, the ledger sheet recognition system 100 of the embodiment includes the image forming apparatus 300. The ledger sheet recognition system 100 of the embodiment, however, is not limited to this configuration, and may not include the image forming apparatus 300.

A hardware configuration of the server 200 of the embodiment will be described with reference to FIG. 2.

Figure 2:
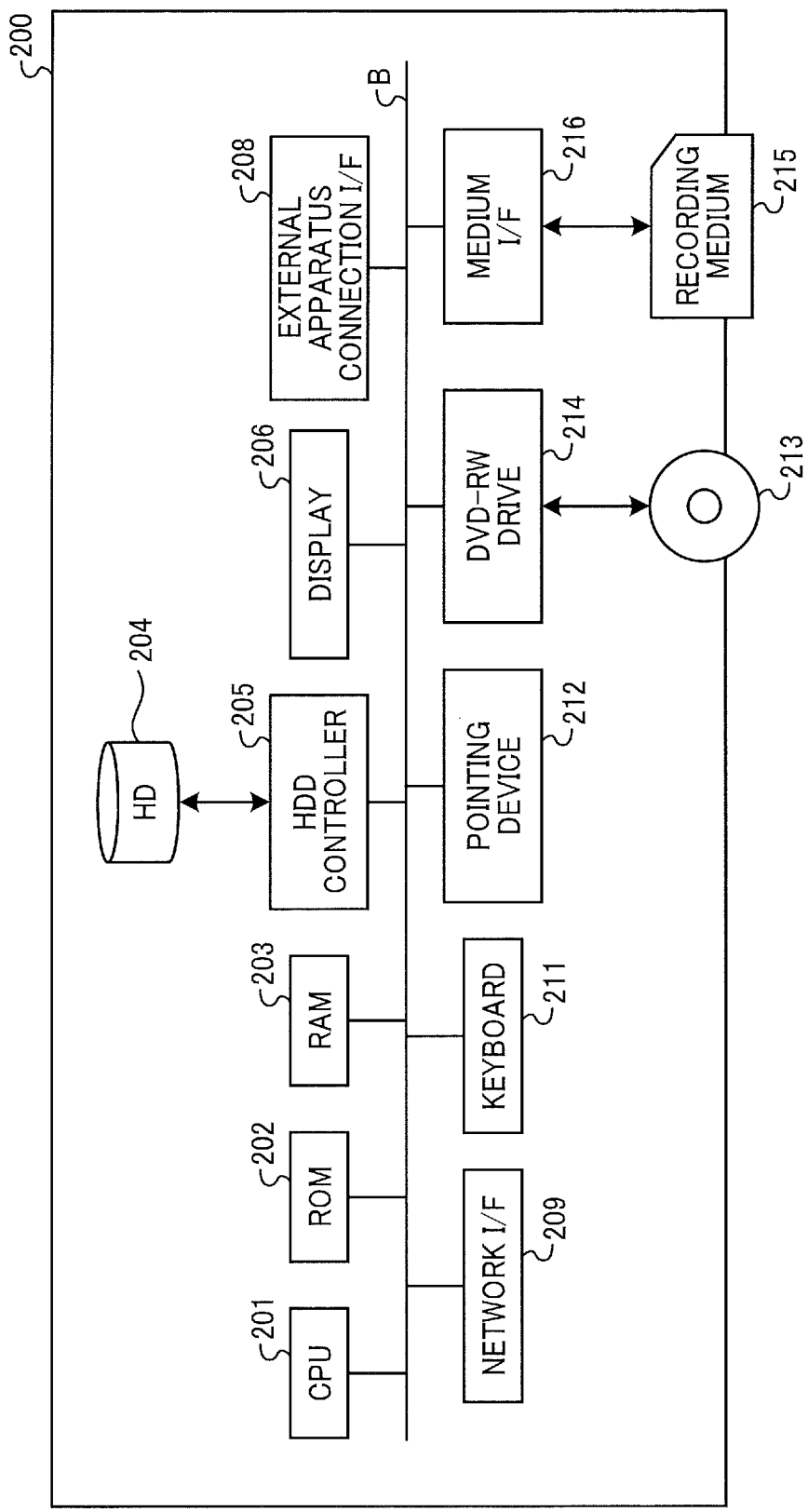
FIG. 2 is a diagram illustrating an example of the hardware configuration of a server included in the ledger sheet recognition system of the embodiment.

FIG. 2 is a diagram illustrating an example of the hardware configuration of the server 200. The server 200 of the embodiment is implemented by a computer. As illustrated in FIG. 2, the server 200 includes a central processing unit (CPU) 201, a read only memory (ROM) 202, a random access memory (RAM) 203, a hard disk (HD) 204, a hard disk drive (HDD) controller 205, a display 206, an external apparatus connection interface (I/F) 208, a network I/F 209, a data bus B, a keyboard 211, a pointing device 212, a digital versatile disk-rewritable (DVD-RW) drive 214, and a medium I/F 216.

The CPU 201 controls the overall operation of the server 200. The ROM 202 stores a program used to drive the CPU 201, such as an initial program loader (IPL). The RAM 203 is used as a work area for the CPU 201. The HD 204 stores various data of programs, for example. The HDD controller 205 controls writing and reading of various data to and from the HD 204 under the control of the CPU 201. The display 206 is a display device that displays various information such as a cursor, menus, windows, text, and images.

The external apparatus connection I/F 208 is an interface for connecting the server 200 to various external apparatuses. The external apparatuses in this case include a universal serial bus (USB) memory and a printer, for example. The network I/F 209 is an interface for performing data communication via a communication network such as the network N. The data bus B includes an address bus and a data bus for electrically connecting the CPU 201 and the other components in FIG. 2 to each other.

The keyboard 211 is an input device including a plurality of keys for inputting text, numerical values, and various instructions, for example. The pointing device 212 is an input device used to select and execute various instructions, select a processing target, and move the cursor, for example. The DVD-RW drive 214 controls writing and reading of various data to and from a DVD-RW 213 as an example of a removable recording medium. The removable recording medium is not limited to the DVD-RW, and may be a DVD-recordable (DVD-R), for example. The medium I/F 216 controls writing (i.e., storage) and reading of data to and from a recording medium 215 such as a flash memory.

The server 200 of the embodiment may be a smartphone, a tablet terminal, a personal digital assistant (PDA), or a wearable personal computer (PC), for example.

The terminal apparatus 400 of the embodiment, which is a computer including an arithmetic processing device and storage devices, may be a tablet terminal apparatus or a smartphone, for example.

Figure 3:
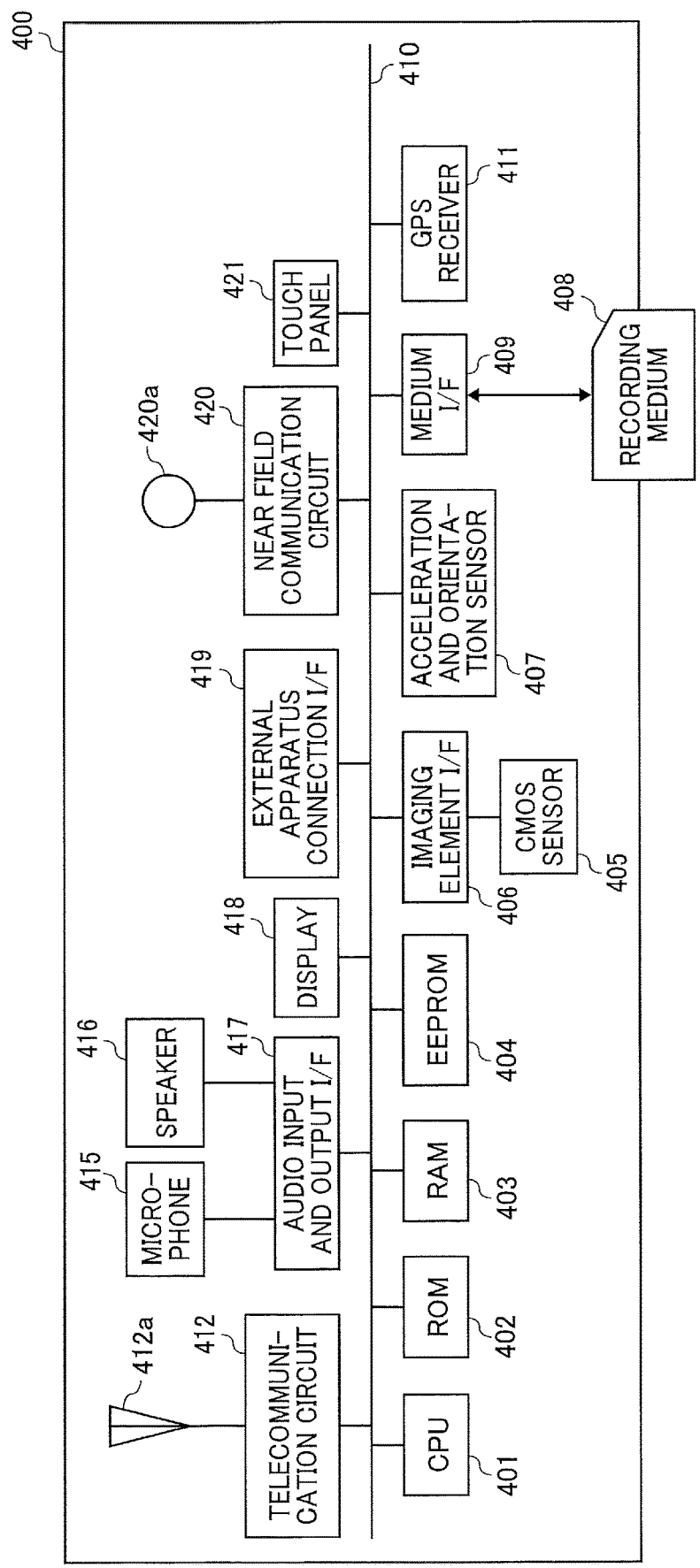
FIG. 3 is a diagram illustrating an example of the hardware configuration of a terminal apparatus included in the ledger sheet recognition system of the embodiment.

FIG. 3 is a diagram illustrating an example of the hardware configuration of the terminal apparatus 400. The terminal apparatus 400 of the embodiment includes a CPU 401, a ROM 402, a RAM 403, an electrically erasable programmable read only memory (EEPROM) 404, a complementary metal oxide semiconductor (CMOS) sensor 405, an imaging element I/F 406, an acceleration and orientation sensor 407, a medium I/F 409, and a global positioning system (GPS) receiver 411.

The CPU 401 is an arithmetic processing device that controls the overall operation of the terminal apparatus 400. The ROM 402 stores programs for the CPU 401 and a program used to drive the CPU 401 such as an IPL. The RAM 403 is used as a work area for the CPU 401. The EEPROM 404 writes or reads various data of a program for the terminal apparatus 400, for example, under the control of the CPU 401. The ROM 402, the RAM 403, and the EEPROM 404 are examples of the storage devices of the terminal apparatus 400.

The CMOS sensor 405 is a built-in imaging device that captures the image of a subject (mainly the image of a user) under the control of the CPU 401 to obtain image data. The CMOS sensor 405 may be replaced by another imaging device such as a charge coupled device (CCD) sensor.

The imaging element I/F 406 is a circuit that controls the driving of the CMOS sensor 405. The acceleration and orientation sensor 407 includes various types of sensors such as an electromagnetic compass that detects geomagnetism, a gyrocompass, and an acceleration sensor. The medium I/F 409 controls data writing (i.e., storage) and reading to and from a recording medium 408 such as a flash memory. The GPS receiver 411 receives a GPS signal from a GPS satellite.

The terminal apparatus 400 further includes a telecommunication circuit 412, an antenna 412a for the telecommunication circuit 412, a microphone 415, a speaker 416, an audio input and output I/F 417, a display 418, an external apparatus connection I/F 419, a near field communication circuit 420, an antenna 420a for the near field communication circuit 420, a touch panel 421, and a data bus 410.

The telecommunication circuit 412 is a circuit that communicates with another apparatus via a communication network. The microphone 415 is a built-in circuit that converts sound into an electrical signal. The speaker 416 is a built-in circuit that convers an electrical signal into physical vibration to produce the sound of music or voice, for example. The audio input and output I/F 417 is a circuit that processes the input of an audio signal from the microphone 415 and the output of an audio signal to the speaker 416 under the control of the CPU 401.

The display 418 is a liquid crystal or organic electroluminescence (EL) display, for example, which displays the image of the subject and various icons, for example. The external apparatus connection I/F 419 is an interface for connecting the terminal apparatus 400 to various external apparatuses. The near field communication circuit 420 is a communication circuit conforming to a standard such as near field communication (NFC) or Bluetooth (registered trademark). The touch panel 421 is an input device for the user to operate the terminal apparatus 400 by pressing the display 418. The display 418 is an example of a display device included in the terminal apparatus 400. The data bus 410 includes an address bus and a data bus for electrically connecting the CPU 401 and the other components in FIG. 3 to each other.

A description will be given of the recognition result DB 260, the output DB 270, the master DB 280, and the association DB 290 included in the server 200 of the embodiment.

FIG. 4 is a diagram illustrating an example of the recognition result DB 260. The recognition result DB 260 of the embodiment includes text data 260-1 extracted from the ledger sheet image data and journal information 260-2 input by the user.

In the text data 260-1, each item name and a corresponding item value are associated with each other. In the example of FIG. 4, the item name and the item value are further associated with information representing the type of the item value. In the text data 260-1, the item name and the item value may also be associated with information representing the respective positions of the item name and the item value in the ledger sheet image.

Specifically, the text data 260-1 includes, for example, data in which an item name "biller" and an item value "XXYY Center" are associated with each other, data in which an item name "date of invoice" and an item value "2018/07/20" are associated with each other, and data in which an item name "tax-excluded billing amount" and an item value "1,657,600" are associated with each other.

In the journal information 260-2, each identifier (ID) for identifying a corresponding record included in the journal information is associated with item values corresponding to journal items.

Specifically, in a record with a record ID I1 in the journal information 260-2, a journal item "price" and an item value "119,600" are associated with each other, and a journal item "item code" and an item value "0001" are associated with each other. Further, a journal item "component code" and an item value "12345678" are associated with each other.

The recognition result DB 260 of the embodiment is an example of data stored in a recognition result storage area.

FIG. 5 is a diagram illustrating an example of the output DB 270. The output DB 270 of the embodiment stores the output data in which the item values included in the recognition result data of each ledger sheet image data are arranged in the order according to the format of the core system 500. That is, the output DB 270 is an example of output data stored in an output data storage area.

In the example of FIG. 5, the output data includes item values "XXYY Center," "2018/7/20," "119,600," and so forth. It is understood here that the item values in the text data 260-1 are sequentially arranged. The output data illustrated in FIG. 5 is CSV-formatted data, for example.

FIG. 6 is a diagram illustrating an example of the master DB 280. The master DB 280 of the embodiment stores the master data corresponding to each core system 500. That is, the master DB 280 of the embodiment is an example of the master data stored in a master storage area. In the embodiment, the master data is data in which the journal items are associated with the item values of the journal items.

The master DB 280 in the example of FIG. 6 includes master data 280-1 and master data 280-2.

The master data 280-1 includes journal items "account item code," "account item name," and "index," for example. Each of these journal items is associated with values that may be the item values of the journal item. The master data 280-1 is understood as account item master data related to the account item, in which the journal item "account item code" is associated with the other journal items.

The master data 280-2 includes journal items "account item code," "subsidiary item code," and "subsidiary item name," for example. Each of these journal items is associated with values that may be the item values of the journal item. The master data 280-2 is understood as subsidiary item master data related to the subsidiary item code, in which the journal item "subsidiary item code" is associated with the other journal items.

FIG. 6 illustrates an example of the master data corresponding to the single core system 500. If the ledger sheet recognition system 100 provides the output data to a plurality of core systems 500, the master DB 280 stores respective master data sets corresponding to the plurality of core systems 500.

FIG. 7 is a diagram illustrating an example of the association DB 290. The association DB 290 of the embodiment stores, for each core system 500, the association information in which the item values forming the output data are associated with the arrangement order of the item values. That is, the association DB 290 of the embodiment is an example of the association information stored in an association information storage area. In other words, the association information of the embodiment is information representing the output order of the item values included in the recognition result data.

The example in FIG. 7 indicates that the initial item value of the output data is a date-formatted value, that the item value output thereafter is the item value of the first journal item of the account item master data, and that the item value output thereafter is the item value of the second journal item of the subsidiary item master data.

The item value of the first journal item of the account item master data is the item value of the journal item "account item code," and the item value of the second journal item of the subsidiary item master data is the item value of the journal item "subsidiary item code" (see FIG. 6).

The association information of the embodiment may include identification information for identifying the corresponding core system 500, for example.

Functions of the server 200 of the embodiment will be described with reference to FIGS. 8A and 8B.

Figure 8:
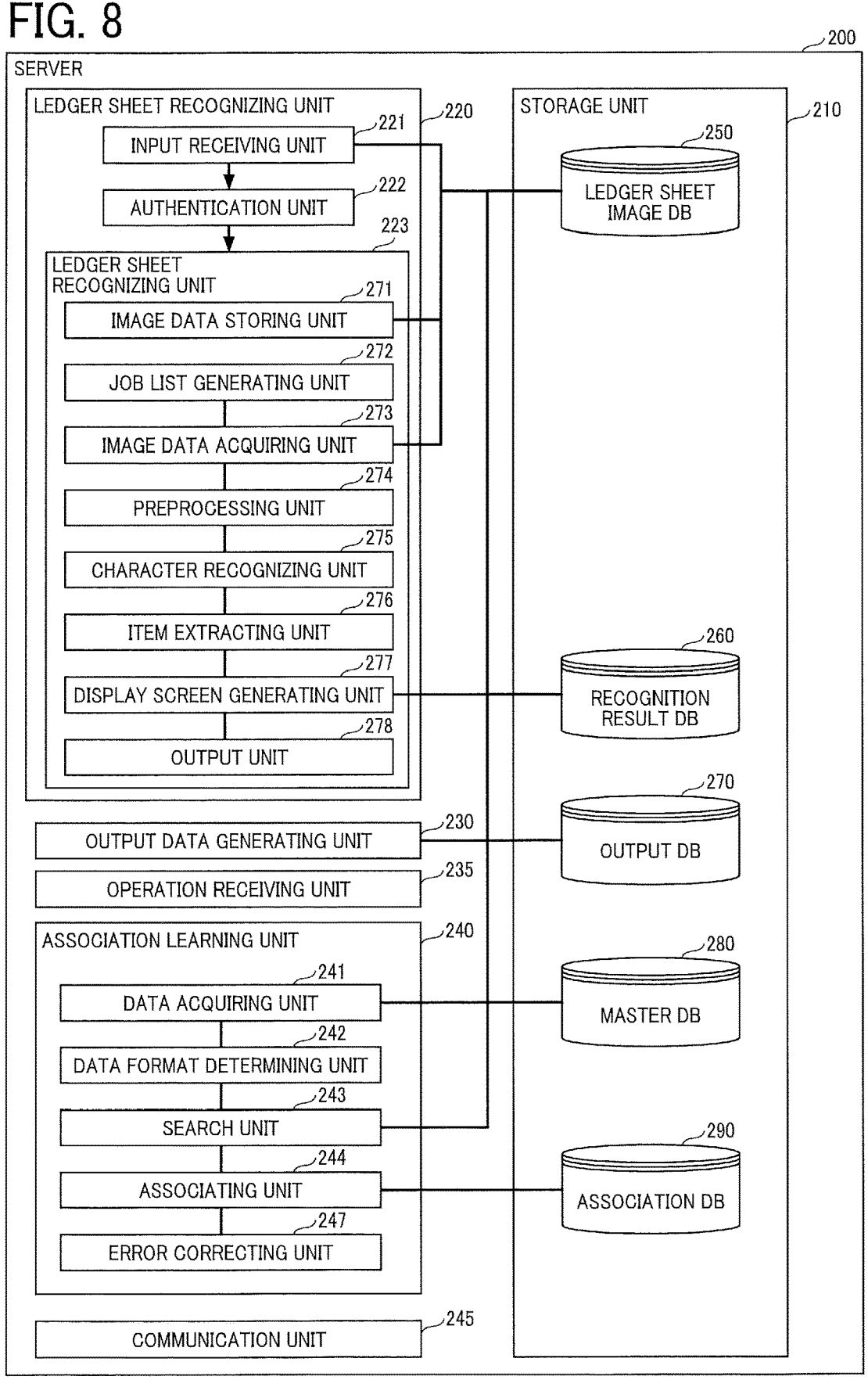
FIG. 8 is a diagram illustrating functions of the server of the embodiment.

FIGS. 8A and 8B are a diagram illustrating functions of the server 200. In the server 200 of the embodiment, the CPU 201 reads and executes an information processing program stored in a memory such as the HD 204, for example, to thereby implement the functions of the units described below.

The server 200 of the embodiment includes the ledger sheet recognizing unit 220, the output data generating unit 230, an operation receiving unit 235, the association learning unit 240, and a communication unit 245.

The ledger sheet recognizing unit 220 includes an input receiving unit 221, an authentication unit 222, and a ledger sheet recognizing unit 223.

The input receiving unit 221 receives a variety of inputs to the server 200. Specifically, the input receiving unit 221 receives input of authentication information for logging in to the ledger sheet recognition system 100. The authentication information includes a user ID and a password, for example. The input receiving unit 221 further receives input of the ledger sheet image data transmitted from the image forming apparatus 300, for example.

Further, the input receiving unit 221 may receive the input to the server 200 via the communication unit 245, or may directly receive the input to the server 200. Specifically, the input receiving unit 221 may receive input of information such as the journal information, for example.

The authentication unit 222 performs authentication based on the authentication information input to the input receiving unit 221. For example, the authentication unit 222 may transmit the input authentication information to an authentication server disposed outside the server 200, and may acquire a result of authentication performed by the authentication server. If the user is authenticated, the authentication unit 222 may transmit the ledger sheet image data received by the input receiving unit 221 to the ledger sheet recognizing unit 223.

The ledger sheet recognizing unit 223 of the embodiment includes an image data storing unit 271, a job list generating unit 272, an image data acquiring unit 273, a preprocessing unit 274, a character recognizing unit 275, an item extracting unit 276, a display screen generating unit 277, and an output unit 278.

When the input receiving unit 221 receives the ledger sheet image data from the image forming apparatus 300 via the communication unit 245, the image data storing unit 271 stores the ledger sheet image data in the ledger sheet image DB 250.

When the input receiving unit 221 receives the input of the ledger sheet image data from the image forming apparatus 300 via the communication unit 245, the job list generating unit 272 registers a job in a job list, and manages the job list. Details of the job list will be described later.

The image data acquiring unit 273 acquires the ledger sheet image data stored in the ledger sheet image DB 250.

The preprocessing unit 274 performs preprocessing for the ledger sheet recognition on the ledger sheet image data acquired by the image data acquiring unit 273.

The character recognizing unit 275 extracts, from the ledger sheet image data, character strings and information representing the disposition positions of the character strings, and holds the extracted character strings and information as reading result data. Details of the reading result data will be described later.

The item extracting unit 276 generates the recognition result data based on the reading result data, and stores the generated recognition result data in the recognition result DB 260. In the recognition result data, the items and the values of the items extracted from the ledger sheet data are associated with each other. The recognition result data of the embodiment includes issuer information representing the issuer of the ledger sheet. The issuer information is described in the ledger sheet. That is, the recognition result data includes information represented by character strings described in the ledger sheet.

The display screen generating unit 277 generates the recognition result check screen with the recognition result data stored in the recognition result DB 260.

The output unit 278 outputs, via the communication unit 245, the data of the recognition result check screen generated by the display screen generating unit 277. That is, via the communication unit 245, the output unit 278 causes the terminal apparatus 400 to display, on a World Wide Web (web) browser, the recognition result check screen generated by the display screen generating unit 277.

The output data generating unit 230 of the embodiment generates the output data from the recognition result data with reference to the association DB 290. The output data generating unit 230 further outputs the output data to the core system 500 via the communication unit 245.

The output data generating unit 230 further stores the output data output to the core system 500 in the output DB 270 as the already output data.

Via the communication unit 245, the operation receiving unit 235 receives an operation performed on a screen displayed on the web browser of the terminal apparatus 400. More specifically, in the embodiment, the communication unit 245 receives information representing the operation from the terminal apparatus 400, and the operation receiving unit 235 receives input of the information received by the communication unit 245.

The association learning unit 240 of the embodiment includes a data acquiring unit 241, a data format determining unit 242, a search unit 243, an associating unit 244, and an error correcting unit 247.

The data acquiring unit 241 acquires a variety of data to be used in the processing of the association learning unit 240. Specifically, the data acquiring unit 241 acquires the output data stored in the output DB 270 and the recognition result data stored in the recognition result DB 260 The recognition result data includes the text data and the journal information. The data acquiring unit 241 further acquires the master data corresponding to the core system 500 from the master DB 280.

The data format determining unit 242 determines the data format of the item values included in the output data acquired by the data acquiring unit 241. Specifically, the data format determining unit 242 determines whether the item values included in the output data are data in the date format for representing dates.

With the item values included in the output data, the search unit 243 performs a search through the recognition result data and the master data acquired by the data acquiring unit 241, and identifies the item names corresponding to the item values.

The associating unit 244 stores the item names identified through the search by the search unit 243 and the positions of the item values in the output data into the association DB 290 in association with each other. The positions of the item values in the output data represent the arrangement order of the item values in the output data.

If an error notification is transmitted from the core system 500 in response to the output data generated by the output data generating unit 230, the error correcting unit 247 corrects the output data and updates the association information.

The communication unit 245 of the embodiment is a function implemented by the network I/F 209, for example, to enable the server 200 to transmit and receive data to and from an external apparatus. Specifically, for example, the communication unit 245 transmits a notification to the terminal apparatus 400 to instruct the terminal apparatus 400 to display a screen. The communication unit 245 further transmits the output data to the core system 500.

Functions of the terminal apparatus 400 of the embodiment will be described with reference to FIG. 9.

Figure 9:
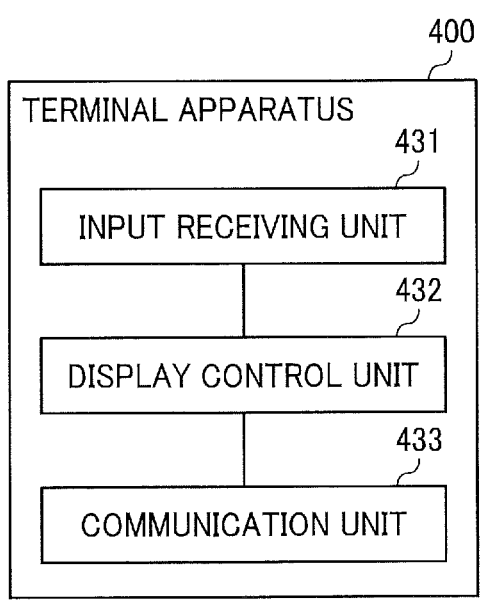
FIG. 9 is a diagram illustrating functions of the terminal apparatus of the embodiment.

FIG. 9 is a diagram illustrating functions of the terminal apparatus 400. The functions of the following units of the terminal apparatus 400 are implemented when the CPU 401 of the terminal apparatus 400 reads and executes a program stored in a memory such as the ROM 402.

The terminal apparatus 400 of the embodiment includes an input receiving unit 431, a display control unit 432, and a communication unit 433.

The input receiving unit 431 receives the input to the screen displayed on the web browser of the terminal apparatus 400 by the display control unit 432.

The display control unit 432 controls the display of the display 418 of the terminal apparatus 400. Specifically, the display control unit 432 causes the display 418 (i.e., a display device) to display the screen according to the instruction from the server 200.

The communication unit 433 is a function implemented by the telecommunication circuit 412 and the antenna 412*a* therefor, for example, to enable the terminal apparatus 400 to transmit and receive data to and from another apparatus.

An operation of the ledger sheet recognition system 100 of the embodiment will be described below with reference to FIGS. 10A and 10B.

Figure 10B:
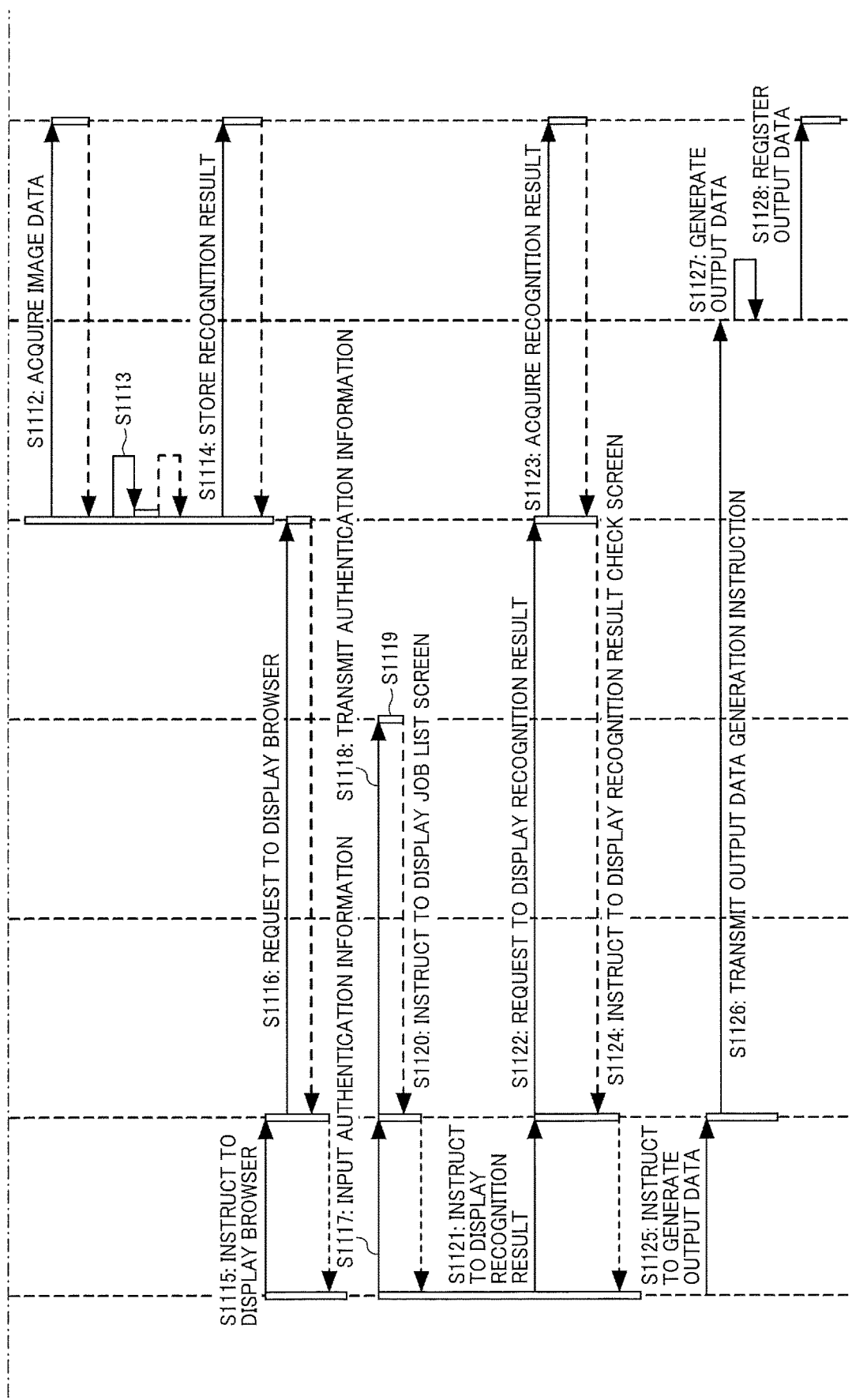

FIGS. 10A and 10B are a sequence diagram illustrating an operation of the ledger sheet recognition system 100.

In the ledger sheet recognition system 100, the image forming apparatus 300 receives a request from the user to start an application for executing the ledger sheet recognition (step S1101), and starts the application (step S1102).

The image forming apparatus 300 then receives input of authentication information from the user (step S1103), and transmits the authentication information to the server 200 to request authentication (step S1104).

In response to receipt of the authentication request, the server 200 performs the authentication with the authentication unit 222, and transmits a result of the authentication to the image forming apparatus 300 (step S1105). The processes described below are performed when the user is authenticated.

The image forming apparatus 300 then receives an instruction to scan the ledger sheet (step S1106), and scans the ledger sheet to acquire the ledger sheet image data (step S1107). The image forming apparatus 300 then transmits the ledger sheet image data to the server 200 (step S1108).

In the server 200, the input receiving unit 221 receives the input of the ledger sheet image data, and the authentication unit 222 transmits the ledger sheet image data to the ledger sheet recognizing unit 223 (step S1109). In the example of FIG. 10A, the ledger sheet image data is transmitted to the ledger sheet recognizing unit 223 via the authentication unit 222. However, the transmission of the ledger sheet image data is not limited thereto. The ledger sheet image data may be transmitted to the ledger sheet recognizing unit 223 without via the authentication unit 222.

In the ledger sheet recognizing unit 223 of the server 200, in response to receipt of the ledger sheet image data, the job list generating unit 272 registers a job in the job list (step S1110). Then, in the ledger sheet recognizing unit 223, the image data storing unit 271 stores the ledger sheet image data in the ledger sheet image DB 250 (step S1111).

Then, with the image data acquiring unit 273, the ledger sheet recognizing unit 223 acquires the ledger sheet image data to be recognized from the ledger sheet image DB 250 (step S1112). The ledger sheet recognizing unit 223 then executes the process of recognizing the ledger sheet image (step S1113). Details of the process of step S1113 will be described later.

Then, the ledger sheet recognizing unit 223 stores the recognition result data generated by the item extracting unit 276 in the recognition result DB 260 (step S1114).

In the ledger sheet recognition system 100, the input receiving unit 431 of the terminal apparatus 400 receives input of a browser display instruction from the user (step S1115). Then, via the communication unit 433, the terminal apparatus 400 transmits a browser display request to the server 200 to display the browser for displaying the recognition result data (step S1116).

Further, the input receiving unit 431 of the terminal apparatus 400 receives input of authentication information from the user (step S1117), and the communication unit 433 transmits the authentication information to the server 200 (step S1118).

With the authentication unit 222, the server 200 performs the authentication of the user (step S1119). The server 200 then transmits a result of the authentication to the terminal apparatus 400, and causes the terminal apparatus 400 to display the job list (step S1120). The processes described here are performed when the user is authenticated.

Then, in the terminal apparatus 400, the input receiving unit 431 receives the selection of a job from the job list as an instruction to display the recognition result of the ledger sheet image (step S1121), and the communication unit 433 transmits a display request to the server 200 (step S1122).

In response to receipt of the display request, the server 200 acquires the recognition result data from the recognition result DB 260 (step S1123). The server 200 then generates the recognition result check screen, and causes the terminal apparatus 400 to display the recognition result check screen on the browser of the terminal apparatus 400 (step S1124), to thereby enable the user to check the recognition result on the displayed recognition result check screen. In the embodiment, the journal information is input to the recognition result check screen.

Then, in the terminal apparatus 400, the input receiving unit 431 receives an instruction to generate the output data based on the recognition result (step S1125), and the communication unit 433 transmits the output data generation instruction to the server 200 (step S1126).

In the server 200, in response to receipt of the output data generation instruction, the output data generating unit 230 generates the output data based on the recognition result data (step S1127), and registers (i.e., stores) the output data in the output DB 270 in the storage unit 210 (step S1128).

The server 200 of the embodiment may output the output data to the core system 500 before storing the output data in the output DB 270. That is, at step S1128, the server 200 may transmit the generated output data to the core system 500 and then store the transmitted output data in the output DB 270 as the already output data (i.e., the output data already provided to the core system 500).

The job list generated by the job list generating unit 272 of the embodiment will be described with reference to FIG. 11.

FIG. 11 is a diagram illustrating an example of the job list. In the server 200 of the embodiment, in response to receipt of the ledger sheet image data input from the image forming apparatus 300, the job list generating unit 272 holds the ledger sheet image data and a job ID associated therewith as a job list.

A job list 101 of the embodiment includes information items "job ID," "issuer," "ledger sheet image file path," "recognition result file path," and "status."

The value of the information item "job ID" is an identifier for identifying the job, i.e., an identifier for identifying the ledger sheet image data received from the image forming apparatus 300.

The value of the information item "issuer" is an identifier for identifying the issuer of the ledger sheet (invoice) who has logged in to the ledger sheet recognition system 100.

The value of the information item "ledger sheet image file path" is information representing the storage location of the ledger sheet image data.

The value of the information item "recognition result file path" is information representing the storage location of the recognition result data representing the recognition result of the ledger sheet image.

The value of the information item "status" represents the progress of the recognition of the ledger sheet image. That is, the value of the information item "status" represents the state of the job.

In the embodiment, the value of the information item "status" is one of four statuses: unprocessed, saved as draft, confirmed, and externally output, which are defined as follows.

The unprocessed status (a first status) is a state immediately after the acquisition of the recognition result data through the ledger sheet recognition. In this state, operations such as checking the recognition result data have not been executed.

The saved-as-draft status (a second status) is a state in which the operations such as checking the recognition result data are ongoing and the recognition result data has not been confirmed.

The confirmed status (a third status) is a state in which the operations such as checking the recognition result data have been completed and the recognition result data has been stored in the recognition result DB 260 as confirmed information. The recognition result data in the confirmed status includes the journal information.

The externally output status (a fourth status) is a state in which the output data generated from the recognition result data has been transmitted to the core system 500, such as an accounting system, which cooperates with the ledger sheet recognition system 100.

In the server 200 of the embodiment, in response to receipt of the ledger sheet image data from the image forming apparatus 300, the job list generating unit 272 assigns a job ID to the ledger sheet image data, and adds a record of the ledger sheet image data to the job list 101 in association with the user ID acquired as the authentication information. When the ledger sheet image data is stored in the ledger sheet image DB 250, the job list generating unit 272 adds the information of the storage location of the ledger sheet image data to the job list 101 as the value of the information item "ledger sheet image file path."

Further, when the recognition result data is stored in the recognition result DB 260, the job list generating unit 272 adds the information of the storage location of the recognition result data to the job list 101 as the value of the information item "recognition result file path," and sets the value of the information item "status" to "confirmed."

In the embodiment, the job list 101 generated by the job list generating unit 272 may be displayed, for example. In this case, the user is able to check the progress of the recognition of the ledger sheet image via a job list screen displayed based on the job list 101.

A process of the ledger sheet recognizing unit 223 of the embodiment will be described with reference to FIG. 12.

Figure 12:
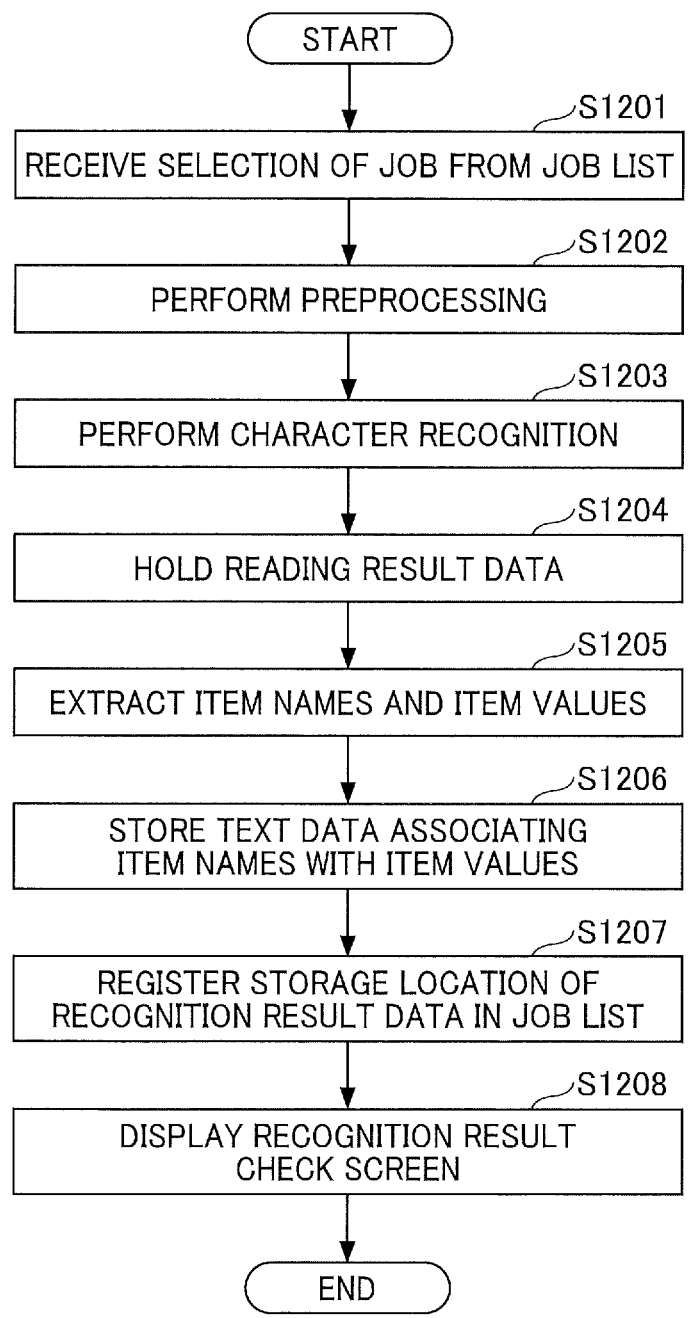
FIG. 12 is a flowchart illustrating a process of a ledger sheet recognizing unit in the server of the embodiment.

FIG. 12 is a flowchart illustrating a process of the ledger sheet recognizing unit 223. FIG. 12 illustrates details of the process of step S1113 in FIG. 10A. The process illustrated in FIG. 12 is performed when a plurality of ledger sheet image data items are received from the image forming apparatus 300.

The ledger sheet recognizing unit 223 of the embodiment receives the selection of a job from the job list 101 (step S1201). Then, the preprocessing unit 274 performs the preprocessing for the ledger sheet recognition on the ledger sheet image data acquired by the image data acquiring unit 273 (step S1202). Specifically, the preprocessing includes a correction process to adjust the orientation of the ledger sheet image, for example.

Then, in the ledger sheet recognizing unit 223, the character recognizing unit 275 clips characters from character fields in the ledger sheet image, and performs character recognition on the clipped characters (step S1203). The character fields are the areas in which the characters are formed. In this process, the character recognizing unit 275 further acquires the coordinates representing the positions of the clipped characters.

Then, the ledger sheet recognizing unit 223 generates the reading result data based on the relative positions of character strings recognized by the character recognizing unit 275, and holds the generated reading result data (step S1204).

Specifically, based on the coordinates of the recognized characters, the ledger sheet recognizing unit 223 recognizes characters separated from each other by a distance equal to or less than a preset threshold value as one character string. Then, the ledger sheet recognizing unit 223 generates the reading result data by associating the character string (i.e., a keyword) with information such as the coordinates representing the position of the area in which the character string is formed.

Then, in the ledger sheet recognizing unit 223, the item extracting unit 276 extracts the character strings corresponding to the item names and the item values based on the reading result data (step S1205). The item extracting unit 276 then generates the text data associating the extracted item names and item values with each other, and stores the generated text data in the recognition result DB 260 as the recognition result data (step S1206).

The job list generating unit 272 of the ledger sheet recognizing unit 223 then registers the storage location of the recognition result data in the job list 101 (step S1207).

Then, the display screen generating unit 277 of the ledger sheet recognizing unit 223 causes the terminal apparatus 400 to display the recognition result check screen generated with the recognition result data (step S1208). The ledger sheet recognizing unit 223 then completes the process thereof.

In the example of FIG. 12, the process up to the step of causing the terminal apparatus 400 to display the recognition result data has been described as one sequence of steps. The process of the ledger sheet recognizing unit 223, however, is not limited to this example. The ledger sheet recognizing unit 223 may cause the terminal apparatus 400 to display the recognition result data in response to receipt of the request to display the recognition result data from the terminal apparatus 400.

The recognition result check screen displayed on the terminal apparatus 400 will be described with reference to FIG. 13.

Figure 13:
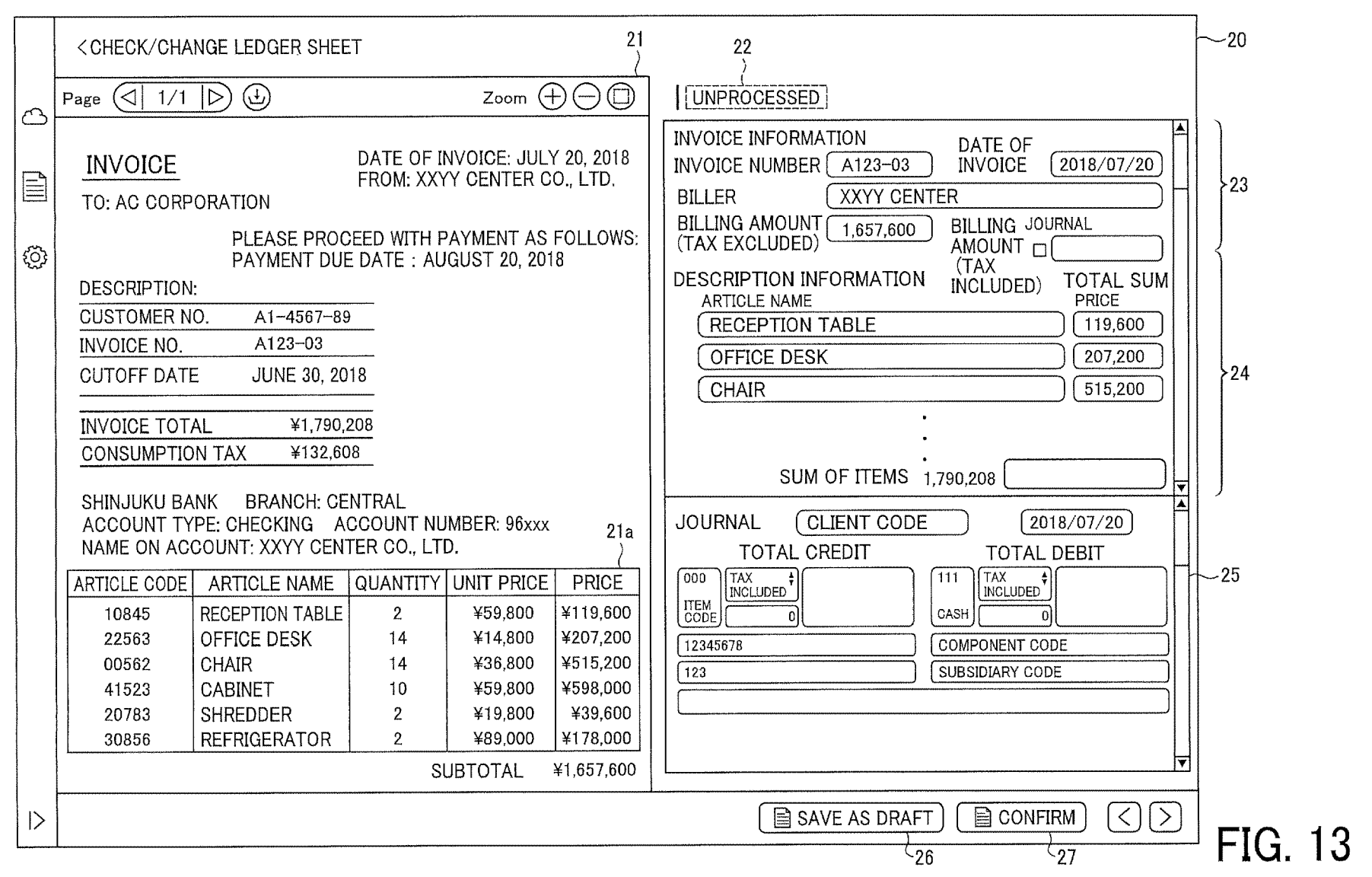

FIG. 13 is a diagram illustrating an example of the recognition result check screen. A screen 20 illustrated in FIG. 13 is an example of the recognition result check screen displayed on the display 418 of the terminal apparatus 400, for example. The screen 20 includes display fields 21, 22, 23, and 24, an input field 25, and operation buttons 26 and 27.

The display field 21 displays the ledger sheet image represented by the ledger sheet image data. The display field 22 displays information representing the job status. In the example of FIG. 13, the display field 22 displays the status "unprocessed." It is therefore understood that the recognition result data displayed on the screen 20 is in the unprocessed status (i.e., the first status).

The display field 23 displays the invoice information acquired from the ledger sheet image displayed in the display field 21. More specifically, the display field 23 displays biller-related information and the billing amount included in the invoice information, for example.

The display field 24 displays the description information acquired from the ledger sheet image displayed in the display field 21.

In the example of FIG. 13, the ledger sheet image displayed in the display field 21 includes a table 21a as the description section representing the breakdown of a transaction. In the description information of the embodiment, which is information mainly extracted from the table 21a included in the ledger sheet image, the item names described in the table 21a are associated with the item values described in the same row.

Specifically, the table 21a includes item names "article code," "article name," "quantity," "unit price," and "price," for example, and item values "10845," "reception table," "2," "59,800," and "119,600" are described in the same row as the item values corresponding to these item names.

For example, therefore, the item value "reception table" of the item name "article name" and the item value "119,600" of the item name "price" are displayed in the display field 24 as the description information.

The input field 25 includes a plurality of input fields for inputting the item values of the journal items. In the example of FIG. 13, the status displayed in the display field 22 is "unprocessed," and there is no item value input to the input field 25, i.e., the input fields included in the input field 25 are blank.

In the embodiment, when an operation of selecting a journal item is performed on the screen 20, for example, the item values of the journal item may be displayed in a pull-down list based on the master data corresponding to the core system 500 as the output destination of the output data. Further, in the embodiment, an item value selected from the pull-down list may be determined as the item value of the journal item, and the journal item and the item value may be associated with each other in the journal information. Therefore, the item value of the journal item in the journal information of the embodiment corresponds to a character string included in the master data.

Further, in the embodiment, the journal information and the text data displayed in the display fields 23 and 24 (i.e., the invoice information and the description information) form the recognition result data.

The operation button 26 is operated to change the job status displayed on the screen 20 to the saved-as-draft status. In the embodiment, when the operation button 26 is operated, the job status is changed from the unprocessed status to the saved-as-draft status. Consequently, the display in the display field 22 is changed to "saved as draft" from "unprocessed."

The operation button 27 is operated to change the job status to the confirmed status. In the embodiment, when the operation button 27 is operated, the display in the display field 22 is changed to the confirmed status from the unprocessed status or the saved-as-draft status.

In the embodiment, the operation of the operation button 27 may be received as the output data generation instruction. When the operation button 27 is operated on the screen 20, the server 200 may generate the output data from the recognition result data displayed on the screen 20 (i.e., the invoice information, the description information, and the journal information), output the generated output data to the core system 500, store the output data in the output DB 270, and then change the job status to the confirmed status.

The extraction of the description information of the embodiment will be described with reference to FIGS. 14A and 14B.

FIGS. 14A and 14B are diagrams illustrating the extraction of the description information. Information 141 illustrated in FIG. 14A represents a result of character recognition performed by the character recognizing unit 275 on the ledger sheet image data displayed in the display field 21 in FIG. 13.

The information 141 is an example of information extracted from the recognition result of the characters in the character fields clipped from the description section (i.e., the table 21a) and the coordinates representing the positions of the characters.

The character recognizing unit 275 of the embodiment connects neighboring characters in the information 141 to recognize a character string (i.e., a keyword). Specifically, the character recognizing unit 275 may recognize one word as a combination of characters separated from each other by a distance equal to or less than the length of a predetermined number of pixels.

Information 142 illustrated in FIG. 14A represents the character strings recognized by the character recognizing unit 275 and the areas of the character strings. That is, the information 142 is the reading result data obtained from the ledger sheet image by the character recognizing unit 275.

The character recognizing unit 275 further recognizes each of areas in the ledger sheet image data divided by vertical lines and horizontal lines as a cell, and assigns, to the cell, identification information for identifying the cell (i.e., a cell ID).

Information 143 illustrated in FIG. 14A represents the association between the areas recognized as the cells in the description section (i.e., the table 21a) and the respective cell IDs.

For example, in FIG. 14A, the area in which a keyword "article code" is recognized is identified in the information 142 based on the height and width of the keyword with respect to the position represented by the X-coordinate and the Y-coordinate.

It is also understood from the information 143 that the area in which keyword "article code" is recognized corresponds to a cell with a cell ID "2." The keyword "article code" is therefore associated with the cell ID "2" as a keyword included in the description section (i.e., the table 21a). In the information 143, the cell ID is associated with the area in which keyword "article code" is recognized. However, the cell ID is not limited to this example. The cell ID may be replaced by a column ID for identifying the corresponding column in which keywords are vertically arranged and a row ID for identifying the corresponding row in which keywords are horizontally arranged.

The ledger sheet recognizing unit 223 of the embodiment thus associates the keywords (i.e., character strings) and the cells (i.e., the areas) in the ledger sheet image data with each other.

Information 144 illustrated in FIG. 14B is the description information generated based on the reading result data corresponding to the ledger sheet (i.e., the invoice) displayed in the display field 21 in FIG. 13. The information 144 (hereinafter referred to as the description information 144) illustrated in FIG. 14B is therefore part of the recognition result data of the entire ledger sheet image data.

More specifically, the description information 144 is part of the text data 260-1 of the recognition result data (see FIG. 4).

The description information 144 illustrated in FIG. 14B, which is generated by the item extracting unit 276, includes information items "column ID," "item name," "column coordinates," "row ID," and "item value."

The value of the information item "column ID" is the identification information identifying a column included in the description section (i.e., the table 21a). The value of the information item "item name" is the keyword included in a cell in the uppermost row of the table 21a. The value of the information item "column coordinates" is the coordinates of the column. In the embodiment, the column coordinates are the coordinate values of the upper-left point and the lower-right point of the column in the description section (i.e., the table 21a) of the ledger sheet image.

The value of the information item "row ID" is the identification information identifying a row. The value of the information item "item value" is the item value of the corresponding description item.

As observed from the description information 144, the item extracting unit 276 extracts the item name and the item value from the ledger sheet image data and associates the item name and the item value with each other.

A process of the output data generating unit 230 of the embodiment will be described with reference to FIG. 15.

Figure 15:
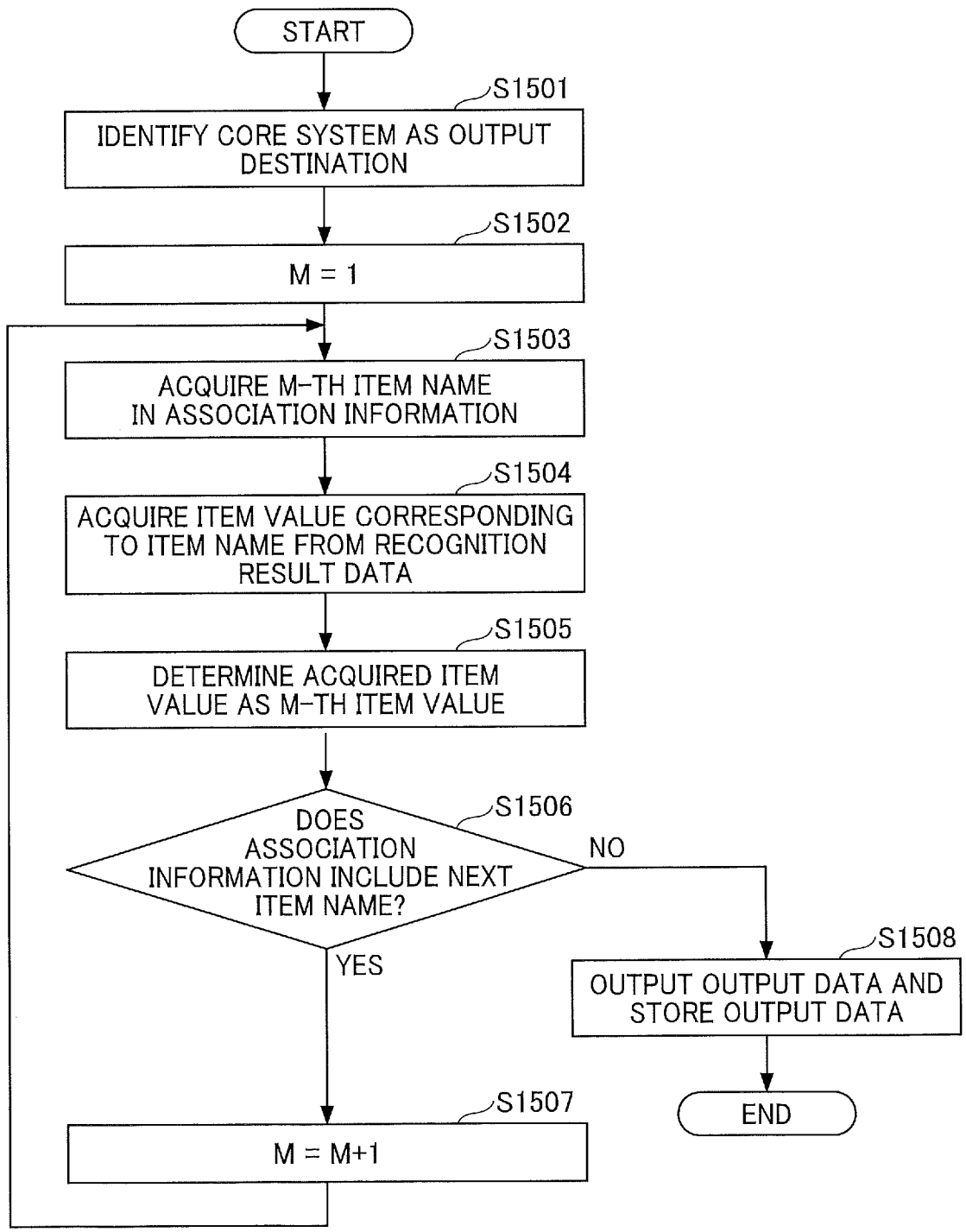
FIG. 15 is a flowchart illustrating a process of an output data generating unit in the server of the embodiment.

FIG. 15 is a flowchart illustrating a process of the output data generating unit 230. FIG. 15 illustrates details of the process of step S1127 in FIG. 10B.

In the server 200, the output data generating unit 230 identifies the core system 500 as the output destination of the output data (step S1501). Specifically, the server 200 may cause the terminal apparatus 400 to display a screen for the user to select the core system 500. Then, when the core system 500 is selected on the terminal apparatus 400, the server 200 may identify the selected core system 500 as the core system 500 being the output destination.

Then, the output data generating unit 230 sets the value of a variable M to 1 (step S1502). The output data generating unit 230 then identifies the association information in the association DB 290 corresponding to the core system 500 identified as the output destination, and acquires the M-th item name in the identified association information (step S1503).

The output data generating unit 230 then acquires the item value corresponding to the M-th item name from the recognition result data acquired by the ledger sheet recognizing unit 220 (step S1504).

Then, the output data generating unit 230 determines the acquired item value as the M-th item value (step S1505), and determines whether the association information includes a next item name (step S1506).

If it is determined at step S1506 that the association information includes a next item name (YES at step S1506), the output data generating unit 230 increments the value of the variable M by 1 (step S1507), and returns to the process of step S1503.

If it is determined at step S1506 that the association information does not include a next item name (NO at step S1506), the output data generating unit 230 outputs the output data, in which the item values are arranged in the order of the item names represented by the association information, to the core system 500 as the output destination, and stores the already output data in the output DB 270 (step S1508). Then, the output data generating unit 230 completes the process thereof.

The process of outputting the output data to the core system 500 as the output destination and the process of storing the output data in the output DB 270 may be executed at different times.

A process of the association learning unit 240 will be described with reference to FIGS. 16A, 16B, and 16C.

Figure 16A:
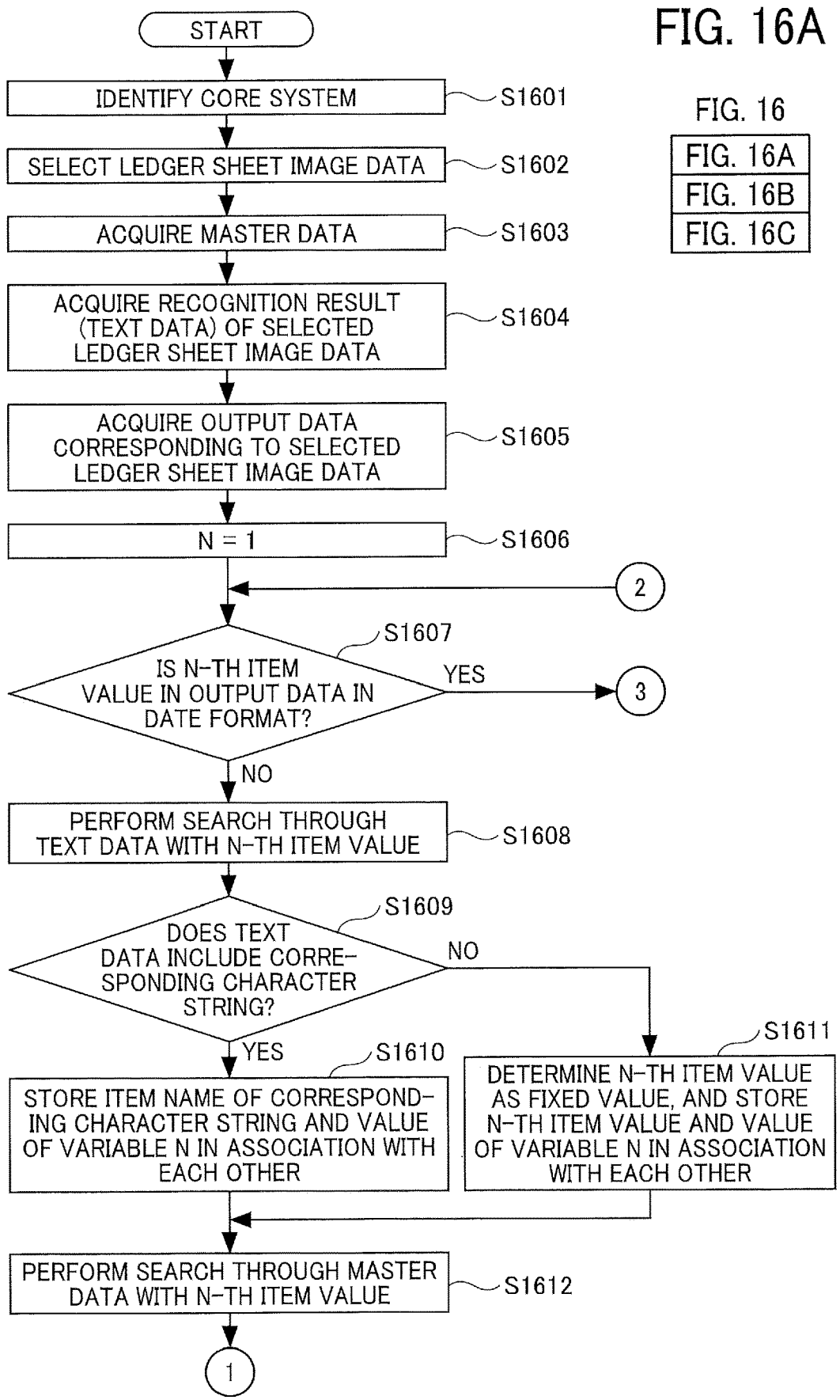
FIGS. 16A, 16B, and 16C are a flowchart illustrating a process of an association learning unit in the server of the embodiment.
Figure 16B:
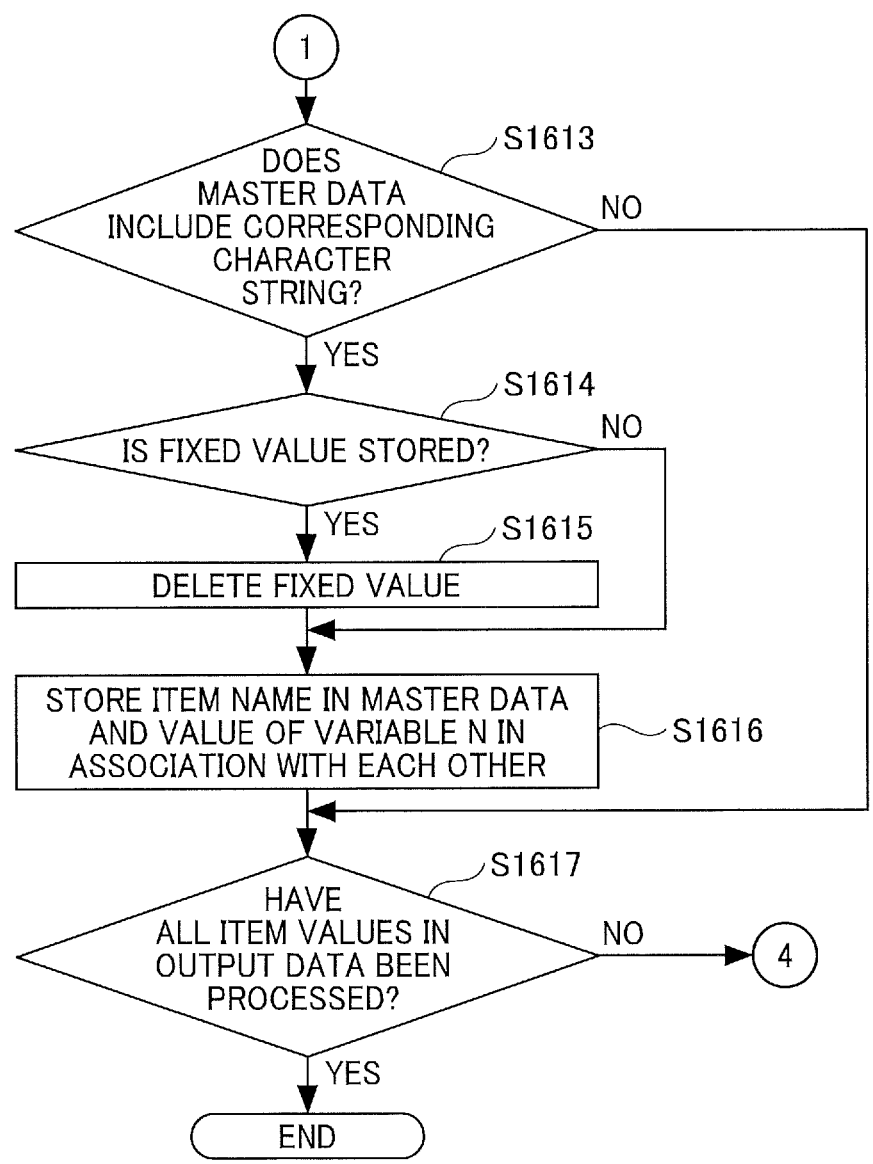
Figure 16C:
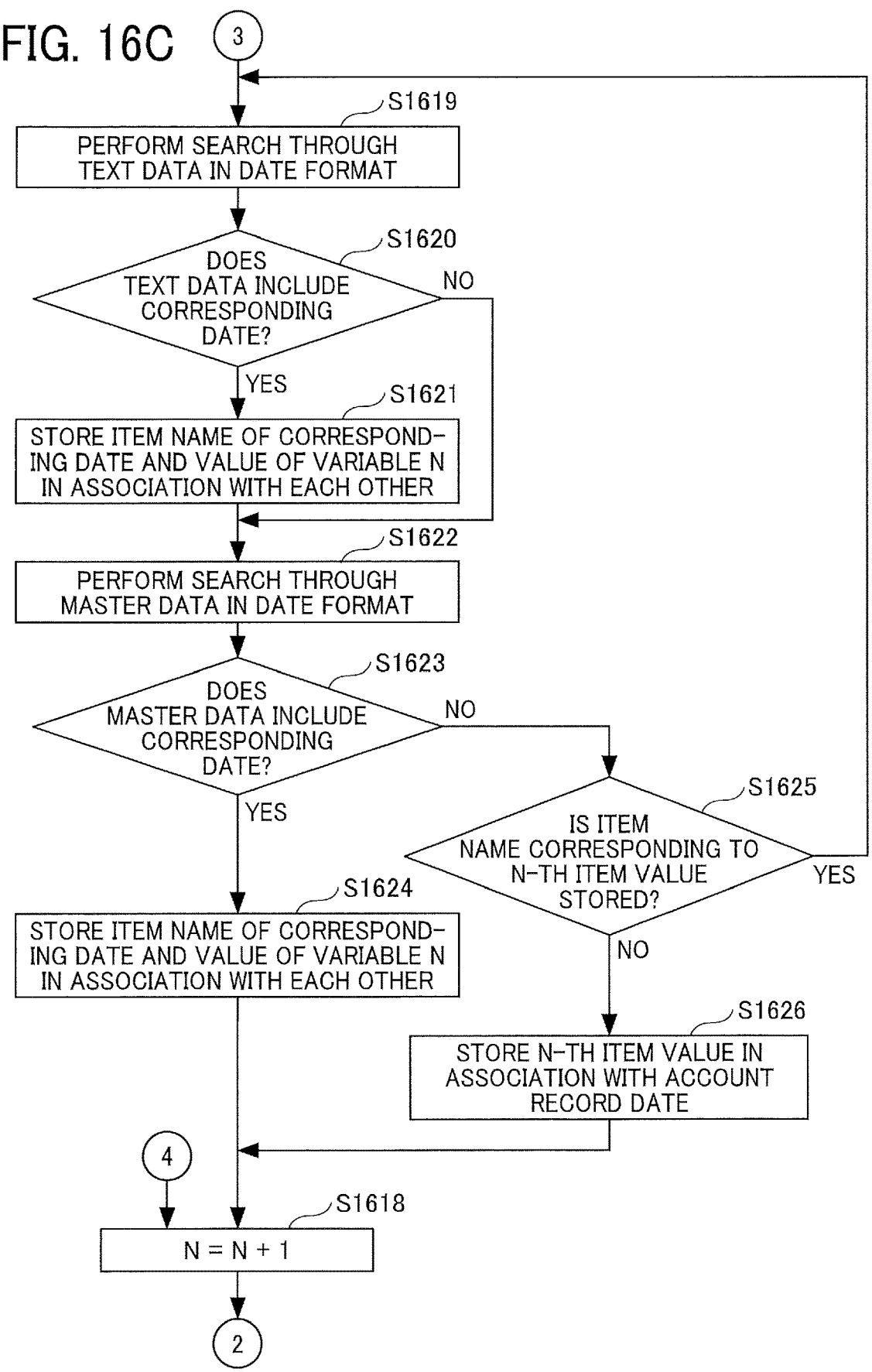

FIGS. 16A, 16B, and 16C are a flowchart illustrating a process of the association learning unit 240.

In the server 200, the association learning unit 240 identifies the core system 500 as the output destination of the output data (step S1601). Specifically, the server 200 may cause the terminal apparatus 400 to display the screen for the user to select the core system 500. Then, when the core system 500 is selected on the terminal apparatus 400, the server 200 may identify the selected core system 500 as the core system 500 being the output destination.

Then, in the association learning unit 240, the data acquiring unit 241 selects the ledger sheet image data from the ledger sheet image DB 250 (step S1602). Specifically, the data acquiring unit 241 may select the ledger sheet image data by causing the terminal apparatus 400 to display a ledger sheet image data list to prompt the user to select from the list the ledger sheet image data to be used in a learning process.

The ledger sheet image data selected in this step is the ledger sheet image data acquired in the past, i.e., the ledger sheet image data based on which the ledger sheet recognition and the provision of the output data to the core system 500 have been executed.

The data acquiring unit 241 then acquires, from the master DB 280, the master data corresponding to the core system 500 identified at step S1601 (step S1603).

Then, the data acquiring unit 241 acquires, from the recognition result DB 260, the recognition result data corresponding to the selected ledger sheet image data (step S1604). The recognition result data acquired in this step includes the text data including the invoice information and the description information acquired from the ledger sheet image data read in the past.

The data acquiring unit 241 then acquires, from the output DB 270, the output data corresponding to the selected ledger sheet image data (step S1605). The output data acquired in this step has been provided to the core system 500 in the past, and is determined to be correct data in the learning process of the association information. For example, the output data acquired in this step may have been manually input by the user in accordance with the format of the core system 500 with reference to the recognition result data.

In the embodiment, the ledger sheet image data, the recognition result data acquired based on the ledger sheet image data, and the output data generated from the recognition result data may be assigned with identification information that associates the ledger sheet image data, the recognition result data, and the output data with each other. In response to selection of the ledger sheet image data, the data acquiring unit 241 may acquire the recognition result data and the output data including the identification information corresponding to the selected ledger sheet image data.

The association learning unit 240 then sets the value of a variable N to 1 (step S1606). Then, the data format determining unit 242 of the association learning unit 240 determines whether the data format of the N-th item value in the output data acquired at step S1605 is the date format (step S1607). If it is determined at step S1607 that the data format of the N-th item value in the output data is the date format (YES at step S1607), the association learning unit 240 proceeds to the process of step S1619, which will be described later.

If it is determined at step S1607 that the data format of the N-th item value in the output data is not the date format (NO at step S1607), the search unit 243 of the association learning unit 240 performs a search through the text data included in the recognition result data acquired at step S1604 by using the N-th item value in the output data as a search key (step S1608).

The search unit 243 then determines whether the text data includes the character string matching the search key (step S1609). That is, the search unit 243 determines whether the text data includes the character string matching the N-th item value in the output data.

If it is determined at step S1609 that the text data includes the character string matching the search key (YES at step S1609), the associating unit 244 of the association learning unit 240 stores the item name corresponding to the character string (i.e., the character string matching the N-th item value) and the value of the variable N in the association DB 290 in association with each other (step S1610). Then, the association learning unit 240 proceeds to the process of step S1612.

That is, in this step, the item name corresponding to the character string included in the recognition result data is associated with the position of the item value of the item name in the output data. Herein, the character string matching the search key may completely or partially match the search key.

If it is determined at step S1609 that the text data does not include the character string matching the search key (NO at step S1609), the associating unit 244 of the association learning unit 240 determines the N-th item value in the output data as a fixed value, and stores the N-th item value and the value of the variable N in the association DB 290 in association with each other (step S1611). Then, the association learning unit 240 proceeds to the process of step S1612.

Then, the search unit 243 of the association learning unit 240 performs a search through the master data acquired at step S1603 by using the N-th item value in the output data as a search key (step S1612).

The search unit 243 then determines whether the master data includes the character string matching the search key (step S1613). That is, it is determined here whether the N-th item value in the output data has been selected from the master data as the item value of the journal item.

At step S1613, the master data including the character string matching the search key indicates that the N-th item value in the output data has been selected from the master data as the item value of the journal item. Meanwhile, the master data not including the character string matching the search key indicates that the N-th item value in the output data has not been selected from the master data as the item value of the journal item.

If it is determined at step S1613 that the master data does not include the character string matching the search key (NO at step S1613), the association learning unit 240 proceeds to the process of step S1617, which will be described later.

If it is determined at step S1613 that the master data includes the character string matching the search key (YES at step S1613), the associating unit 244 determines whether a fixed value is stored in the association DB 290 as the N-th item value (step S1614).

If it is determined at step S1614 that no fixed value is stored in the association DB 290 as the N-th item value (NO at step S1614), the associating unit 244 proceeds to the process of step S1616, which will be described later.

If it is determined at step S1614 that a fixed value is stored in the association DB 290 as the N-th item value (YES at step S1614), the associating unit 244 deletes the fixed value (step S1615).

The associating unit 244 then stores the item name in the master data corresponding to the character string (i.e., the character string matching the N-th item value) and the value of the variable N in the association DB 290 in association with each other (step S1616). Then, the association learning unit 240 proceeds to the process of step S1617.

That is, in this step, the item name corresponding to the character string included in the master data is associated with the position of the item value of the item name in the output data.

Then, the association learning unit 240 determines whether all item values included in the acquired output data have been processed (step S1617).

If it is determined at step S1617 that all item values included in the output data have been processed (YES at step S1617), the association learning unit 240 completes the process thereof.

If it is determined at step S1617 that the item values included in the output data includes an unprocessed item value (NO at step S1617), the association learning unit 240 increments the value of the variable N by 1 (step S1618), and returns to the process of step S1607.

If it is determined at step S1607 that the data format of the N-th item value in the output data is the date format (YES at step S1607), the search unit 243 of the association learning unit 240 performs a search through the text data in the date format (step S1619). That is, the search unit 243 searches through the text data for date-formatted data with the N-th date in the output data.

The search unit 243 then determines whether the text data includes the N-th date (step S1620).

If it is determined at step S1620 that the text data does not include the N-th date (NO at step S1620), the association learning unit 240 proceeds to the process of step S1622, which will be described later.

If it is determined at step S1620 that the text data includes the N-th date (YES at step S1620), the associating unit 244 stores the item name in the text data corresponding to the N-th date and the value of the variable N in the association DB 290 in association with each other (step S1621).

Then, the search unit 243 performs a search through the master data in the date format (step S1622). That is, the search unit 243 searches through the master data for date-formatted data with the N-th date in the output data.

The search unit 243 then determines whether the master data includes the N-th date (step S1623).

If it is determined at step S1623 that the master data includes the N-th date (YES at step S1623), the associating unit 244 stores the item name in the master data corresponding to the N-th date and the value of the variable N in the association DB 290 in association with each other (step S1624). Then, the association learning unit 240 proceeds to the process of step S1618.

If it is determined at step S1623 that the master data does not include the N-th date (NO at step S1623), the associating unit 244 determines whether the item name corresponding to the N-th item value is stored in the association DB 290 (step S1625). That is, it is determined here whether the text data includes the N-th date.

If it is determined at step S1625 that the item name corresponding to the N-th item value is stored in the association DB 290 (YES at step S1625), the association learning unit 240 proceeds to the process of step S1619.

If it is determined at step S1625 that the item name corresponding to the N-th item value is not stored in the association DB 290 (NO at step S1625), the associating unit 244 of the association learning unit 240 stores the N-th item value in the association DB 290 in association with an item name "account record date" (step S1626). Then, the association learning unit 240 proceeds to the process of step S1618.

In the embodiment, the association between the item names acquired through the ledger sheet recognition and the positions of the item names in the output data is thus learned with the past ledger sheet image data and the past output data provided to the core system 500 in the past.

More specifically, in the embodiment, based on the text data in which the item names and the item values extracted from the ledger sheet image data are associated with each other (i.e., the text data including the invoice information and the description information) and the output data provided to the core system 500 in the past, the positions, in the output data, of the item names included in the text data are learned.

Further, according to the embodiment, based on the master data for inputting the journal information and the output data provided to the core system 500, the positions, in the output data, of the journal items included in the journal information are learned.

Further, in the embodiment, the association information as the learning result is stored and held in the association DB 290. According to the embodiment, therefore, when the ledger sheet image data is newly acquired, the output data compatible with the format of the core system 500 is automatically generated from the recognition result data with reference to the association information.

Further, in the embodiment, if a plurality of character strings are obtained from the text data or the master data as a search result, or if the process of FIGS. 16A to 16C is repeated, for example, a plurality of item names are associated with the value of the variable N.

In this case, the associating unit 244 may add a weight to each of the plurality of item names associated with the value of the variable N, and may associate the value of the variable N, the plurality of item names, and the respective weights of the item names with each other in the association information.

For example, the weight added to each of the plurality of item names may depend on the frequency of acquisition of the item name as the search result acquired by the search unit 243. In this case, the more frequently the item name is acquired as the search result, the greater the weight added to the item name is.

In the embodiment, when the output data generating unit 230 refers to the weighted association information, the output data generating unit 230 may acquire the item name with the greatest weight at step S1503 in FIG. 15 from the plurality of item names in the association information associated with the value of the variable M.

Even if the association information is updated by the association learning unit 240, therefore, the output data is automatically generated based on the latest learning result. When adding the data extracted by the ledger sheet recognition system 100 to the core system 500, therefore, the embodiment facilitates the generation of the output data compatible with the format of the core system 500, obviating the need for manual data input.

A display example of the embodiment will be described with reference to FIGS. 17 and 18.

Figure 17:
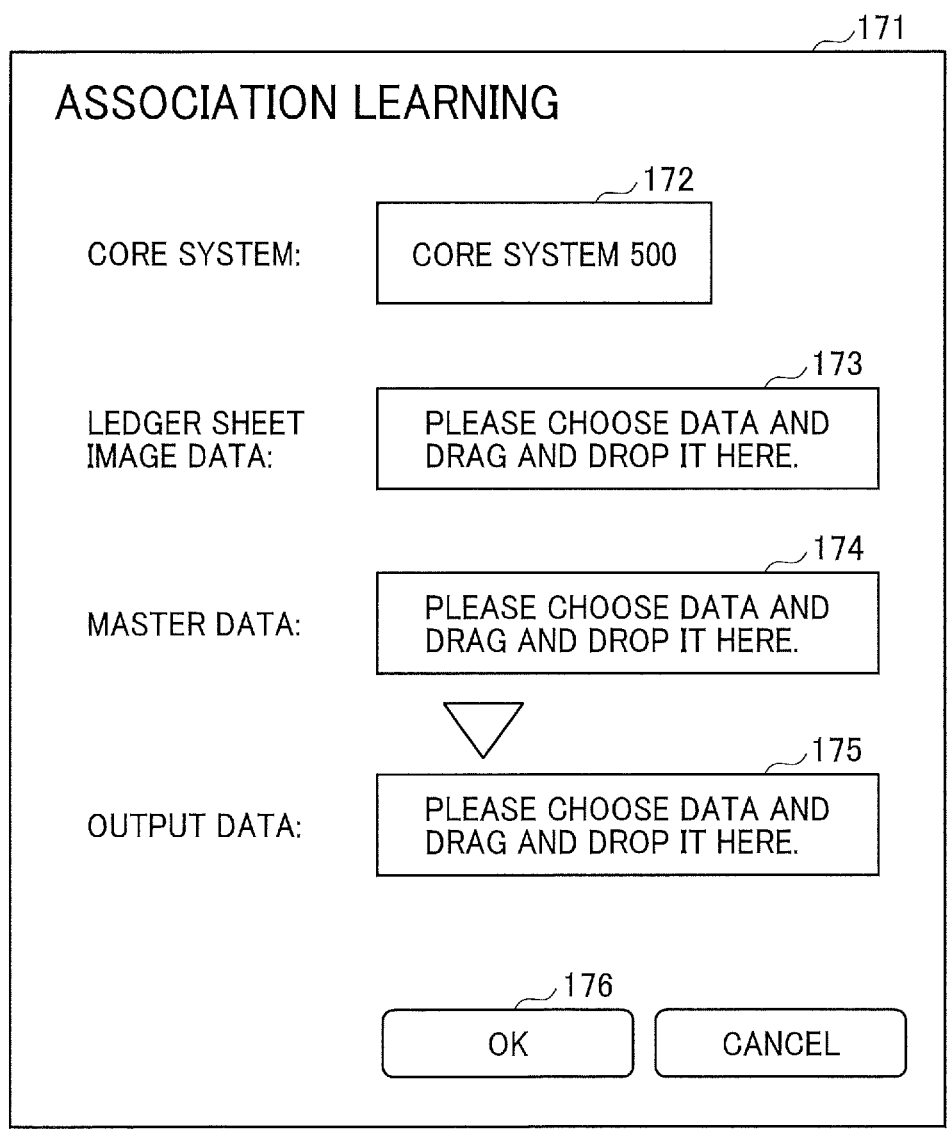
FIG. 17 is a diagram illustrating a display example of the embodiment.

FIG. 17 is a diagram illustrating a display example of the embodiment. A screen 171 illustrated in FIG. 17 is an example of a screen for issuing an instruction to execute the learning process of the association learning unit 240. The screen 171 is displayed on the display 418 of the terminal apparatus 400 at step S1601 in FIG. 16A, for example.

The screen 171 includes input fields 172, 173, 174, and 175 and an operation button 176.

The input field 172 is for identifying the core system 500 as the output destination of the output data. The input field 173 is for selecting the ledger sheet image data. The input field 174 is for selecting the master data. The input field 175 is for selecting the already output data.

In the embodiment, when the core system 500 as the output destination is identified in the input field 172 and the ledger sheet image data is selected in the input field 173, the master data and the output data corresponding to the ledger sheet image data may be automatically selected, and the file name of the master data and the file name of the output data may be displayed in the input field 174 and the input field 175, respectively.

Alternatively, the master data and the output data may be input to the input field 174 and the input field 175, respectively, in the screen 171 by the user through a drag-and-drop operation, for example.

In the embodiment, when the operation button 176 is operated in the state in which the input fields 172 to 175 are input with respective values, the process of FIGS. 16A to 16C may be executed.

The screen 171 may be displayed on an apparatus other than the terminal apparatus 400. For example, the screen 171 may be displayed on the display 206 of the server 200 or on an operation unit of the image forming apparatus 300.

Figure 18:
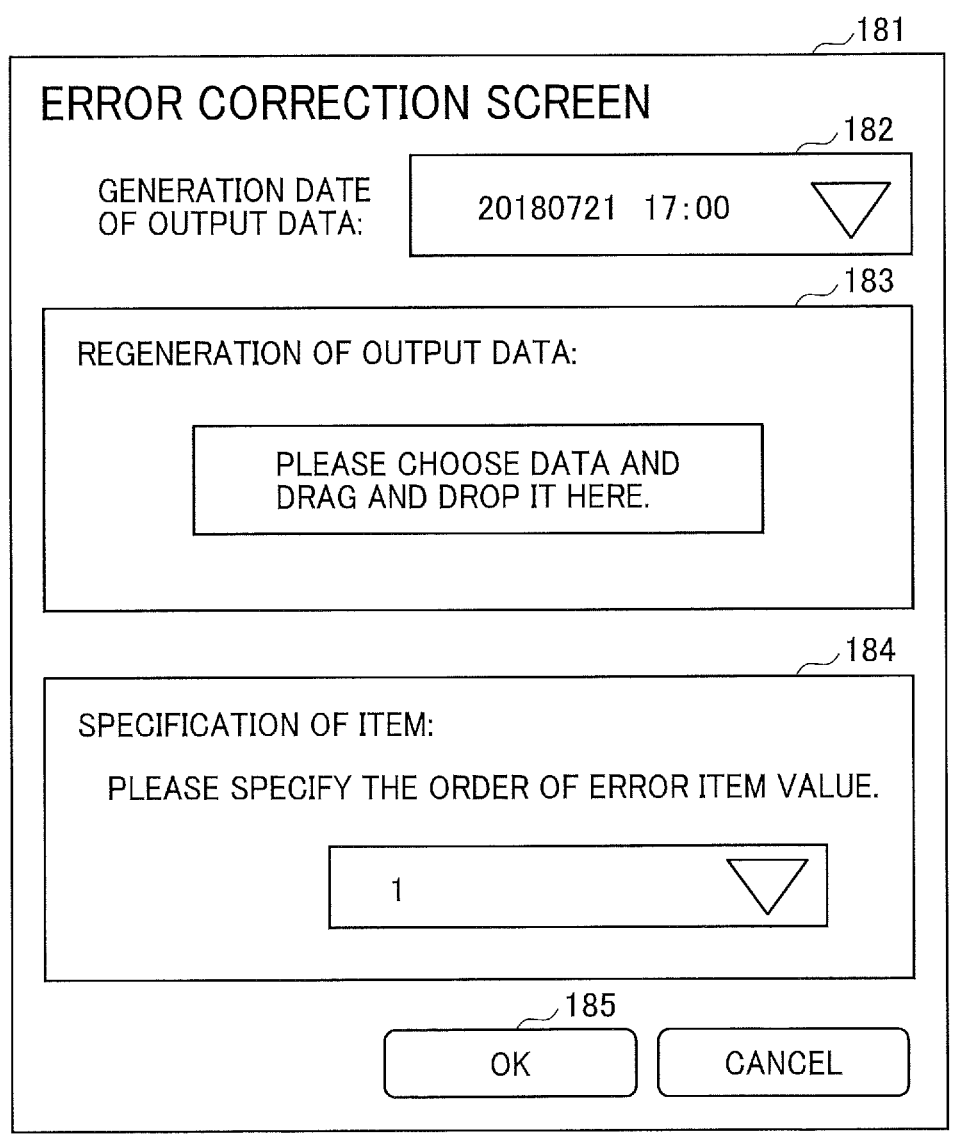
FIG. 18 is a diagram illustrating another display example of the embodiment.

FIG. 18 is a diagram illustrating another display example of the embodiment. A screen 181 illustrated in FIG. 18 is an example of a screen for correcting the output data generated by the output data generating unit 230.

In the embodiment, if the output data generated by the output data generating unit 230 is not compatible with the format of the core system 500, the core system 500 transmits an error notification to the ledger sheet recognition system 100.

In response to receipt of the error notification from the core system 500, the error correcting unit 247 of the association learning unit 240 of the embodiment causes an apparatus such as the terminal apparatus 400 to display the screen 181 to receive correction of the output data determined as an error.

The screen 181 includes an input field 182, display fields 183 and 184, and an operation button 185.

The input field 182 receives input of information for identifying the output data to be corrected. Specifically, the generation date of the output data is input to the input field 182 as the information for identifying the output data. The output data to be corrected is the output data for which the error notification has been transmitted.

The display fields 183 and 184 are for specifying the method of correcting the output data.

The display field 183 is for specifying, as the error correction method, a method of regenerating the output data with the output data generating unit 230. When the ledger sheet image data as the basis of the output data to be corrected is selected in the display field 183, the error correcting unit 247 determines that the error correction method corresponding to the display field 183 has been specified.

The display field 184 is for specifying, as the error correction method, a method of identifying the position of the item value determined as an error in the output data to be corrected. In the embodiment, the error notification transmitted from the core system 500 includes information representing the position of the item value incompatible with the format of the core system 500.

When the position of the item value incompatible with the format of the core system 500 is input to the display field 184, the error correcting unit 247 determines that the error correction method corresponding to the display field 184 has been specified.

When the error correction method is specified and the operation button 185 is operated, the error correcting unit 247 of the embodiment corrects the error of the output data in accordance with the specified method, and reflects the result of the error correction in the association information.

When the error correction method corresponding to the display field 183 is specified, the error correcting unit 247 regenerates the output data with the output data generating unit 230 with the ledger sheet image data selected in the display field 183, and outputs the regenerated output data to the core system 500.

According to this error correction method, if the association information referred to in the generation of the output data with the error has been updated through the learning process of the association learning unit 240, the error is likely to be corrected in the regenerated output data.

Further, when the error correction method corresponding to the display field 184 is specified, the error correcting unit 247 may cause an apparatus such as the terminal apparatus 400 to display the output data to be corrected and a screen for prompting the user to correct the item value at the position corresponding to the error.

In this case, when the item value at the position corresponding to the error is corrected on the screen, i.e., when a new item name is associated with the position corresponding to the error, the error correcting unit 247 reflects the new association between the item name and the position in the association information stored in the association DB 290.

In the embodiment, the correction of the output data and the update of the association information are thus executed in accordance with the error notification transmitted from the core system 500.

According to the embodiment, therefore, the accuracy of the association information is improved. That is, the output data automatically generated from the ledger sheet image data to be compatible with the format of the core system 500 is improved in accuracy.

The apparatuses described in the embodiment form one of a plurality of computing environments for implementing the embodiment disclosed in the present specification.

In an embodiment of the present invention, the server 200 is a server cluster including a plurality of computing devices. The plurality of computing devices are configured to communicate with each other via a desired type of communication link such as a network or a shared memory, for example, to execute the processes disclosed in the present specification. Similarly, the server 200 may include a plurality of computing devices configured to communicate with each other.

Further, the server 200 may be configured to share the disclosed process steps with another apparatus in various combinations. For example, a process executed by the server 200 may be executed by another server. Similarly, a function of the server 200 may be executed by another server. Further, the components of the server 200 and the components of another server may be integrated in a single server, or may be distributed to a plurality of apparatuses.

The databases described in the present specification may be generated as a result of machine learning. Further, if the keywords and account items that may be included in the description of the transaction are categorized by machine learning, it is unnecessary to use the correspondence tables.

Herein, machine learning refers to a technology for causing a computer to acquire learning ability similar to human learning ability. According to the technology, the computer autonomously generates, from previously learned data, algorithms for making decisions such as data identification, and makes predictions by applying the algorithms to new data. The learning method for machine learning may be any of supervised learning, unsupervised learning, semi-supervised learning, reinforcement learning, and deep learning, or may be a combination of two or more of these learning methods. The learning method for machine learning is not limited to a particular method.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing apparatus comprising circuitry configured to
perform ledger sheet recognition on ledger sheet image data,
refer to an association information storage area storing association information representing an output order of a plurality of item values of each of a plurality of item names, the plurality of item values being acquired based on the ledger sheet recognition,
generate output data in which the plurality of item values of the each of the plurality of item names are arranged in the output order represented by the association information, and
output the generated output data,
wherein the ledger sheet image data includes past ledger sheet image data previously acquired and stored, and the output data includes past output data previously output and stored and corresponding to the past ledger sheet image data,
wherein the circuitry is further configured to:
based on an input of the past ledger sheet image data and the past output data, learn a correspondence relationship between each of a plurality of item values obtained from the past ledger sheet image data and a position of the each of the plurality of item values in the past output data, and
output data representing the correspondence relationship as the association information,
refer to a recognition result storage area storing text data extracted from the past ledger sheet image data through the ledger sheet recognition, the text data including
information related to an issuer of a ledger sheet based on which the ledger sheet image data is generated, and
information in which a plurality of description item names and a plurality of description item values described in a description section of the ledger sheet are associated with each other,
for the each of the plurality of item values in the past output data, perform a search through the text data,
associate an item name corresponding to an item value obtained from the text data as a search result with a position of the item value in the past output data,
refer to a master storage area storing master data used to display an input screen for inputting a plurality of item values of a plurality of item names corresponding to the ledger sheet image data,
for the each of the plurality of item values in the past output data, perform a search through the master data, and
associate an item name corresponding to an item value obtained from the master data as a search result with a position of the item value in the past output data,
wherein when the search result includes a plurality of item values, the circuitry
adds a weight according to the search result to each of a plurality of item names corresponding to the plurality of item values, and
associates a position of the each of the plurality of item values in the past output data, the plurality of item names, and the weight added to the each of the plurality of item names with each other.

2. The information processing apparatus of claim 1, wherein when the ledger sheet is an invoice, the master data is used to display an input screen for inputting a plurality of item values of a plurality of journal items.

3. The information processing apparatus of claim 1, wherein the output order of the plurality of item values of the each of the plurality of item names represented by the association information is compatible with a format of a core system as an output destination of the output data.

4. An information processing method comprising:
performing ledger sheet recognition on ledger sheet image data;
referring to an association information storage area storing association information representing an output order of a plurality of item values of each of a plurality of item names, the plurality of item values being acquired based on the ledger sheet recognition;
generating output data in which the plurality of item values of the each of the plurality of item names are arranged in the output order represented by the association information; and
outputting the generated output data,
wherein the ledger sheet image data includes past ledger sheet image data previously acquired and stored, and the output data includes past output data previously output and stored and corresponding to the past ledger sheet image data,
wherein the information processing method further includes:

based on an input of the past ledger sheet image data and the past output data, learning a correspondence relationship between each of a plurality of item values obtained from the past ledger sheet image data and a position of the each of the plurality of item values in the past output data, and outputting data representing the correspondence relationship as the association information, referring to a recognition result storage area storing text data extracted from the past ledger sheet image data through the ledger sheet recognition, the text data including information related to an issuer of a ledger sheet based on which the ledger sheet image data is generated, and information in which a plurality of description item names and a plurality of description item values described in a description section of the ledger sheet are associated with each other, for the each of the plurality of item values in the past output data, performing a search through the text data, associating an item name corresponding to an item value obtained from the text data as a search result with a position of the item value in the past output data, referring to a master storage area storing master data used to display an input screen for inputting a plurality of item values of a plurality of item names corresponding to the ledger sheet image data, for the each of the plurality of item values in the past output data, performing a search through the master data, and associating an item name corresponding to an item value obtained from the master data as a search result with a position of the item value in the past output data, wherein when the search result includes a plurality of item values, the method further comprises:

adding a weight according to the search result to each of a plurality of item names corresponding to the plurality of item values, and associating a position of the each of the plurality of item values in the past output data, the plurality of item names, and the weight added to the each of the plurality of item names with each other.

5. An information processing system comprising:

a memory configured to store association information representing an output order of a plurality of item values of each of a plurality of item names, the plurality of item values being acquired based on ledger sheet recognition; and one or more processors configured to perform the ledger sheet recognition on ledger sheet image data, in response to receipt of an instruction from a terminal apparatus, generate output data in which the plurality of item values of the each of the plurality of item names are arranged in the output order represented by the association information stored in the memory, and output the generated output data, wherein the ledger sheet image data includes past ledger sheet image data previously acquired and stored, and the output data includes past output data previously output and stored and corresponding to the past ledger sheet image data, wherein the one or more processors are further configured to:

based on an input of the past ledger sheet image data and the past output data, learn a correspondence relationship between each of a plurality of item values obtained from the past ledger sheet image data and a position of the each of the plurality of item values in the past output data, and output data representing the correspondence relationship as the association information, refer to a recognition result storage area storing text data extracted from the past ledger sheet image data through the ledger sheet recognition, the text data including information related to an issuer of a ledger sheet based on which the ledger sheet image data is generated, and information in which a plurality of description item names and a plurality of description item values described in a description section of the ledger sheet are associated with each other, for the each of the plurality of item values in the past output data, perform a search through the text data, associate an item name corresponding to an item value obtained from the text data as a search result with a position of the item value in the past output data, refer to a master storage area storing master data used to display an input screen for inputting a plurality of item values of a plurality of item names corresponding to the ledger sheet image data, for the each of the plurality of item values in the past output data, perform a search through the master data, and associate an item name corresponding to an item value obtained from the master data as a search result with a position of the item value in the past output data, wherein when the search result includes a plurality of item values, the one or more processors add a weight according to the search result to each of a plurality of item names corresponding to the plurality of item values, and associate a position of the each of the plurality of item values in the past output data, the plurality of item names, and the weight added to the each of the plurality of item names with each other.

6. The information processing system of claim 5, further comprising the terminal apparatus configured to receive an input of the instruction.

* * * * *